(12) United States Patent
Nakahara et al.

(10) Patent No.: US 7,749,381 B2
(45) Date of Patent: Jul. 6, 2010

(54) HOLLOW FIBER MEMBRANE MODULE, AND A MANUFACTURING METHOD THEREFOR, AND HOUSING FOR HOLLOW FIBER MEMBRANE MODULE

(75) Inventors: Yoshihito Nakahara, Nagoya (JP); Tetsuya Torichigai, Seto (JP); Masatoshi Kamata, Owariasahi (JP); Masanori Ito, Aichi-gun (JP); Kenji Honjou, Nagoya (JP); Hiroyuki Okazaki, Nagoya (JP); Yoshihiro Kakumoto, Seto (JP)

(73) Assignee: Mitsubishi Rayon, Co., Ltd., Tokyo (JP)

( * ) Notice: Subject to any disclaimer, the term of this patent is extended or adjusted under 35 U.S.C. 154(b) by 0 days.

(21) Appl. No.: 12/010,785

(22) Filed: Jan. 30, 2008

(65) Prior Publication Data

US 2008/0164203 A1 Jul. 10, 2008

Related U.S. Application Data

(62) Division of application No. 10/450,659, filed as application No. PCT/JP01/11034 on Dec. 17, 2001, now Pat. No. 7,387,730.

(30) Foreign Application Priority Data

| Dec. 18, 2000 | (JP) | ............................. P2000-383556 |
| Jan. 5, 2001 | (JP) | ............................. P2001-000562 |
| Feb. 5, 2001 | (JP) | ............................. P2001-028343 |
| Mar. 14, 2001 | (JP) | ............................. P2001-072857 |

(51) Int. Cl.
*B01D 63/02* (2006.01)

(52) U.S. Cl. ............................. 210/321.79; 210/321.8; 210/321.88; 210/321.89; 210/500.23; 96/7; 96/8

(58) Field of Classification Search .............. 210/321.8, 210/321.79, 321.88, 321.89, 500.23; 96/7, 96/8

See application file for complete search history.

(56) References Cited

U.S. PATENT DOCUMENTS 3,554,379 A 1/1971 Pye (Continued)

FOREIGN PATENT DOCUMENTS

DE 3827527 A1 2/1990

(Continued)

OTHER PUBLICATIONS

European Office Action dated Dec. 16, 2009 related European Patent Application No. 09174749.3.

*Primary Examiner*—John Kim
(74) *Attorney, Agent, or Firm*—Fitch, Even, Tabin & Flannery

(57) ABSTRACT

In a hollow fiber membrane flat module according to the present invention, both ends of hollow fiber membrane bundle which are formed by bundling a plurality of hollow fiber membrane as a sheet are fixed to two housing separately by a fixing resin while maintaining an opening condition in an opening end section in the follow fiber membrane. Furthermore, a maximum width in an orthogonal direction to a longitudinal direction of the hollow fiber membrane is no longer than 25 mm in a cross section which is orthogonal to a longitudinal direction of the housings, and a maximum deflection in the housings which are measured according to a method for measuring the deflection according to the present invention is not more than 1% of a distance between the two housings. In such a hollow fiber membrane module, it is possible to enhance the integration ratio of the hollow fiber membrane module per a unit volume of the hollow fiber membrane module unit in which there is less deflections in the housing caused by adjust the wavelength dispersion and the dispersion slope always in minimum level automatically only by matching the position of the reflecting mirror 8, the dispersion compensation amount and the dispersion slope compensation amount which correspond to a shape of the reflecting surface 8a on the reflecting mirror 8 which is selected under such a current condition in advance. Factors such as an air bubble, and the entanglement of the hollow fiber membranes is restricted; thus, a hollow fiber membrane is not damaged. Also, in the hollow fiber membrane module, it is preferable that the housing is provided with a reinforcing rib section which strengthens the housing.

1 Claim, 20 Drawing Sheets

U.S. PATENT DOCUMENTS

| | | |
|---|---|---|
| 4,349,440 A | 9/1982 | Esmond |
| 4,666,543 A * | 5/1987 | Kawano ................. 156/169 |
| 5,059,374 A * | 10/1991 | Krueger et al. ............ 264/156 |
| 5,236,586 A | 8/1993 | Antoni et al. |
| 5,409,606 A | 4/1995 | Spencer |
| 6,214,226 B1 | 4/2001 | Kobayashi et al. |
| RE37,549 E | 2/2002 | Mahendran et al. |
| 6,592,759 B2 * | 7/2003 | Rabie et al. ............ 210/321.61 |
| 6,899,811 B2 | 5/2005 | Cote et al. |
| 2003/0010702 A1 * | 1/2003 | Stillig et al. ............ 210/321.8 |

FOREIGN PATENT DOCUMENTS

| | | |
|---|---|---|
| EP | 0598909 A1 | 6/1994 |
| GB | 1569182 | 11/1975 |
| JP | 7-16436 A | 1/1995 |
| JP | 09-09922 A | 4/1997 |
| JP | 2000-84373 A | 3/2000 |
| JP | 2000-288357 A | 10/2000 |
| WO | WO 97/06880 | 2/1997 |
| WO | WO 00/09245 | 2/2000 |
| WO | WO 00/30742 A1 | 6/2000 |
| WO | WO 01/36074 A1 | 5/2001 |

* cited by examiner

Prior Art

Prior Art

HOLLOW FIBER MEMBRANE MODULE, AND A MANUFACTURING METHOD THEREFOR, AND HOUSING FOR HOLLOW FIBER MEMBRANE MODULE

CROSS-REFERENCE TO RELATED APPLICATIONS

This is a divisional of U.S. application Ser. No. 10/450,659, filed Jun. 16, 2003, now U.S. Pat. No. 7,387,730, which is a U.S. National Phase of International Application PCT/JP01/11034, filed Dec. 17, 2001, and claims the benefit of priority under 35 U.S.C. §119 of Japanese Applications 2000-383556, filed Dec. 18, 2000; 2001-000562 filed Jan. 5, 2001; 2001-028343, filed Feb. 5, 2001; and 2001-072857, filed Mar. 14, 2001, the entire disclosures of which are hereby incorporated herein by reference.

TECHNICAL FIELD

The present invention relates to a hollow fiber membrane module, a method for manufacturing therefore, and a hollow fiber membrane module housing which are used for separating and refining a liquid member.

BACKGROUND ART

Conventionally, a hollow fiber membrane module has been used for a lot of purposes such as manufacturing an axenic water, drinking water, and highly pure water, and cleaning an atmosphere. In addition to these purposes, in recent years, the hollow fiber membrane module is used for other purpose for processing a highly contaminated water in secondary processing and a third processing in a sewage plant, a solid-liquid separation in a waste water treatment tank, and a solid-liquid separation of a suspended solid (hereinafter called SS) in an industrial waste water.

A hollow fiber membrane module which is preferably used for filtering a highly contaminated water is disclosed in documents such as Japanese Unexamined Patent Applications, First Publication No. Hei 5-261253, No. H6-000342, and No. H6-000340. According to such a hollow fiber membrane module, an end section of a sheet hollow fiber membrane bundle is contained and fixed in side a rectangular housing by a fixing resin. These hollow fiber membrane module is manufactured by pouring the fixing resin in the housing, fixing the end section of the hollow fiber membrane bundle on the housing by the fixing resin, and cutting a part of the fixing resin such that the end section of the hollow fiber membrane is opened.

However, in such a method, it is necessary to use a housing having a large diameter because it is necessary to insert a cutter in the housing. Therefore, there is a problem in that an integration of the hollow fiber membrane module per a unit volume is low in a hollow fiber membrane module unit when a plurality of the hollow fiber membrane modules are integrated so as to assemble the hollow fiber membrane module unit.

For solving the above problem, a hollow fiber membrane module which is disclosed in the Japanese Unexamined Patent Application, First Publication No. Hei 10-57775 can be named. This hollow fiber membrane module is manufactured by forming a slit on the housing unit which is made from a commercial pipe, forming a potting weir section around the slit, inserting the hollow fiber membrane bundle in which an end section of the hollow fiber membrane is opened in advance in the slit section, pouring a fixing resin inside of the resin potting weir section such that an end section of the hollow fiber membrane is not closed; and fixing the hollow fiber membrane bundle by the fixing resin.

In the manufacturing method of the above hollow fiber membrane module, the hollow fiber membrane bundle is fixed on the housing by the fixing resin, and after that, a process for cutting a part of the fixing resin such that an end section of the hollow fiber membrane is open is omitted. By doing this, it is possible to make a diameter in the housing smaller.

Also, in Japanese Unexamined Patent Application, First Publication No. 200-84373, a hollow fiber membrane module is proposed which is realized by modifying a hollow fiber membrane module which is disclosed in Japanese Unexamined Patent Application, First Publication No. Hei 10-57775. FIG. 27 is a perspective view for such a hollow fiber membrane module. FIG. 28 is a cross section in the housing in the hollow fiber membrane module shown in FIG. 27.

The hollow fiber membrane module 11 approximately comprises a pair of housings 12, a hollow fiber membrane bundle 14 in which a plurality of hollow fiber membranes 13 are bundled as a sheet, and end cap 17 which is attached to and end of the housing 12 and has a processed water exit 16, and an end cap 18 which is attached to another end of the housing 12 and does not have a processed water exit. The hollow fiber membrane bundle 14 is fixed on the housing by the fixing resin 15 under condition that the hollow fiber membrane bundle 14 is inserted in the housing 12 and the opening end section 19 in the hollow fiber membrane 13 is maintained open.

The housing 12 is a hollow columnar member having a U-letter shape which is provided with a hollow inner path 21 which is formed in the housing 12, a slit opening section 22 which is formed on a surface of the housing 12, weirs 24 which are disposed unitarily with the housing unit 23 on both sides of the opening section 22 in parallel with the opening section 22, and a resin pouring section 25 which is sandwiched by the weirs 24.

In the hollow fiber membrane module 11, a diameter in the housing 12 can be further smaller by adapting a housing 12 having a cross section in U-letter shape; thus, it is possible to increase the integration. Simultaneously, an anti-pressure characteristics in the housing 12 improves. A water pressure caused in a reverse-cleaning is applied to the housing 12 repeatedly when a reverse cleaning operation is performed on a solid member in a highly contaminated water which adheres on an outer surface of the hollow fiber membrane 13; therefore, it is necessary to realize an anti-pressure characteristics in the housing 12 particularly when such a highly contaminated water is filtrated.

When a highly contaminated water is filtrated by using such a hollow fiber membrane module 11, a method in which an air bubbling operation by using an air dispersing tube can be commonly used for cleaning a solid member in the highly contaminated water which adheres on an outer surface of the hollow fiber membrane 13 in addition to the above reverse-cleaning method. In this way, various stresses are generated in the hollow fiber membrane module 11 when a filtrating operation is performed by using the hollow fiber membrane module unit. In particular, an ascending flow which is generated in the air bubbling operation applies an upward force on the hollow fiber membrane 13; thus, a force toward the hollow fiber membrane is applied on the housing 12 such that the housing 12 is pulled by the hollow fiber membrane 13 which is driven by the ascending flow. In this way, a deflection in the housing 12 which is caused by the stress which is generated by the air bubble becomes a reason for damaging the hollow fiber membrane 13.

Also, there is a sag in the hollow fiber membrane bundle 14 caused by the deflection in the housing. As a result of this, it sometimes occurs that the hollow fiber membrane bundles 14 in the neighboring hollow fiber membrane modules 11 are entangled each other in the hollow fiber membrane module unit. Also, there are problems in that the hollow fiber membrane module 11 is broken, crumbs and a hair contained in the highly contaminated water accumulates, and a uniform air bubbling operation is not realized because of such an entanglement of the hollow fiber membrane bundle 14 when the hollow fiber membrane module unit is used for a long time.

As explained above, performance in the hollow fiber membrane module unit which uses the hollow fiber membrane module 11 and the module depends on the deflection in the housing 12.

For such a deflection in the housing which is explained here, it is possible to name deflections in two directions mainly such as a deflection in a longitudinal direction of the hollow fiber membrane bundle which is generated during a filtrating operation of the hollow fiber membrane module unit and a deflection in a direction orthogonal to the longitudinal direction of the hollow fiber membrane bundle. It is possible to prevent a deflection in a direction orthogonal to the longitudinal direction of the hollow fiber membrane bundle by various methods such as a method in which dimension of the housing which is used for the hollow fiber membrane module is designed in advance such that the housings are disposed tightly when the hollow fiber membrane module is assembled to be a unit, a method in which a spacer or the like is inserted in a space between the housings in the hollow fiber membrane module when the hollow fiber membrane module is assembled to be a unit, or other simple method. However, a method in which a deflection in the housing in the longitudinal direction of the hollow fiber membrane bundle is restricted so as to prevent the entanglement of the hollow fiber membrane has not been proposed specifically.

Also, in such a hollow fiber membrane module 11, it is necessary to attach end caps 18, 18 for sealing an end section of the housing 13 on the housing 13 in a water-tight manner so as to collect a processed water.

The end caps 17, 18 are usually attached to the housing before the fixing resin 15 is poured into the resin pouring section 25 in the housing 12. For attaching the end caps 17, 18 to the housing 13, a solvent bonding agent, or a bonding resin which is equivalent to the fixing resin 15 are used under condition that members for the end cap 17, 18 and the housing 12 are a polycarbonate member, an acrylic resin member, an ABS resin (acrylonitrile-butadiene-styrene resin) member or a polyvinyl chloride member. These bonding agent is applied to an area in which the housing 12 and the end caps 17, 18 contact each other, after that, the housing 12 and the end caps 17, 18 are attached together.

However, in the hollow fiber membrane module 11 which is explained above, there is a case in which an area to which a bonding agent is applied is broken when an external press is applied to the housing 12, that is, when an excessive force is applied to the end caps 17, 18 which are attached together with the housing 12 repeatedly. Also, it is not easy to apply the bonding agent to the end caps 17, 18; therefore, there is a problem in that a production efficiency decreases.

Furthermore, in the housing which is explained above, there is an non-uniformity in the dimensions in the weir section 24 which is formed on an outer surface of the housing unit 23 and the resin pouring section 25 which is surrounded by the weir section 24 according to the molding condition of the housing 12. In some cases, there is a case in which the weir section 24 is inclined toward thereinside. Also, there is a case in which the hollow fiber membrane 13 falls because of inaccuracy in the dimension of the opening section 22 and the hollow fiber membrane 13 when the hollow fiber membrane 13 is inserted in the housing 12 and the hollow fiber membrane 13 is sandwiched in the opening section 22 so as to be fixed there. In such cases, it is not possible to obtain a sufficient capacity in the pouring section 25. Also, there is a case in which the fixing resin 15 leaks out of the housing 12 when the fixing resin 15 is poured into the resin pouring section 25. Furthermore, sufficient amount of the resin is not used in a potting operation; thus, the fixing resin 15 does not prevail entirely; therefore, a product has a defect. Also, there is a concern for an anti-pressure characteristics and durability because of insufficiency of the potting resin.

Therefore, a main object of the present invention is to provide a hollow fiber membrane module having a superior durability in which the hollow fiber membrane and the housing are not damaged and a method for manufacturing the same.

More specifically, an object of the present invention is to provide a hollow fiber membrane module in which it is possible to increase the integration of the hollow fiber membrane module per a unit volume of the hollow fiber membrane module unit and has a less deflection in the housing caused by factors such as an air bubble and less entanglement of the hollow fiber membrane, and a hollow fiber membrane module unit using the same.

Also, other object of the present invention is to provide a hollow fiber membrane module having a superior mechanical tightness in a section in which the housing and the end caps are attached together, and a method for manufacturing such a hollow fiber membrane module easily and efficiently.

Also, other object of the present invention is to provide a housing in which it is possible to pour the resin and increase a volume for pouring the resin thereinto so as to fix the hollow fiber membrane by the resin while improving an anti-pressure characteristics, and a hollow fiber membrane module using the same.

DISCLOSURE OF INVENTION

A first aspect of the present invention is a hollow fiber membrane flat module in which both ends of hollow fiber membrane bundle which are formed by bundling a plurality of hollow fiber membrane as a sheet are fixed to two housing separately by a fixing resin while maintaining an opening condition in an opening end section in the follow fiber membrane in which a maximum width (A) in an orthogonal direction to a longitudinal direction of the hollow fiber membrane is no longer than 25 mm in a cross section which is orthogonal to a longitudinal direction of the housings, and a maximum deflection in the housings which are measured according to a method for measuring the deflection according to the present invention is not more than 1% of a distance between the two housings. In such a hollow fiber membrane module, it is possible to increase the integration ratio of the hollow fiber membrane module per a unit volume of the hollow fiber membrane module, and there are less deflections in the housing due to factors such as an air bubble, and it is possible to restrict the entanglement of the hollow fiber membrane; thus, the hollow fiber membrane is not damaged.

Method for Measuring a Deflection

Here, a method for measuring a deflection is performed in such a way that:

- both ends of the housing which is to be measured are supported such that a hollow fiber membrane is disposed downwardly;
- another housing is supported such that a mass of the another housing is not applied to the housing which is to be measured;
- 0.05 kg of weights are suspended in every 5 cm of intervals between an end of the housing which is to be measured to the other end of the housing which is to be measured;
- a straightedge is applied on an upper surface of the housing which it to be measured;
- a distance between the uppers surface of the housing which is to be measured and the straightedge; and
- a maximum value of the above distance is defined as a maximum deflection.

Also, in the present invention, in a hollow fiber membrane module, it is preferable that each of housing is provided with a resin pouring sections to which the fixing resin is poured, an opening section to which an end section of the hollow fiber membrane bundle is inserted, and a reinforcing rib section for strengthening an inner path which communicates to the hollow fiber membrane and the housing.

It is possible to restrict further the deflection in the housing if the housing is provided with a reinforcing rib for strengthening the housing.

Also, it is preferable that each of housing is provided with a resin pouring sections to which the fixing resin is poured, an opening section to which an end section of the hollow fiber membrane bundle is inserted, and a reinforcing rib section for strengthening an inner path which communicates to the hollow fiber membrane and the housing.

Also, it is preferable that a cross section of the housing is in an approximate H-letter. Such a hollow fiber membrane module can be handled easily when it is manufactured. Also, it is possible to set the integration ratio of the hollow fiber membrane module in the hollow fiber membrane module unit when the hollow fiber membrane module unit is designed; thus, a strength of the housing against the deflection can be improved.

Also, it is preferable that the housing is provided an engaging section for engaging an external supporting section for supporting the hollow fiber membrane module. In such a hollow fiber membrane module, the external supporting member supports and reinforces the housing; therefore, it is possible to decrease the deflection in the housing.

Also, it is preferable that two concave lanes which are sandwiched by the reinforcing rib sections are formed on a side of the housing, and two convex lanes which extends in a longitudinal direction of the housing as the engaging section while facing each other are formed on the reinforcing rib section so as to face the concave lanes. In such a hollow fiber membrane module, it is possible to engage the housing by the external engaging member reliably. Also, it is possible to attach and detach the external supporting member.

Also, a hollow fiber membrane module unit according to an embodiment of the present invention is characterized in that a plurality of the hollow fiber membrane modules are disposed approximately in parallel, wherein an interval (C) between a center (a) in a width direction of the housing in the hollow fiber membrane module and a center (a') in a width direction of the housing in a neighboring hollow fiber membrane module is no longer than 25 mm. In such a hollow fiber membrane module unit, it is possible to increase the integration ration per a unit volume of the hollow fiber membrane module unit and minimize the deflection in the housing due to factors such as an air bubble. Therefore, it is possible to prevent the hollow fiber membrane module from being broken after long period of operation.

Also, a membrane module housing according to the present invention is characterized in having a hollow columnar shape in which a slit opening section in the longitudinal direction is formed, two convex lanes are formed opposite to the opening sections which sandwich a hollow section in the longitudinal direction, and the width in the opening section increases by pressing the convex lanes horizontally from the housing.

By using such a housing for the hollow fiber membrane module, it is possible to improve the productivity of the hollow fiber membrane module.

Also, it is preferable that the two convex lanes are formed in parallel, and a side of the housing unit and a side of the convex lane are aligned. By using such a housing, it is possible to enhance the integration ratio when the hollow fiber membrane module is assembled to be a unit.

A second aspect of the present invention is characterized in that a membrane module comprises the membrane module housing described in the above aspect and a filtering membrane. It is preferable that at least an end section of the filtering membrane is fixed to the housing by the fixing resin under condition that at least an end section of the filtering membrane is inserted from the opening section of the housing, and the opening end section in the filtering membrane is maintained open. In such a hollow fiber membrane module, there are few cases in which a filtrating membrane is broken or crushed; therefore, there are few defect products.

Also, according to the second aspect of the present invention, it is characterized in that a method for manufacturing a membrane module having steps for pressing the convex lane section horizontally from the membrane module housing described in the above aspect, increasing the width in the opening section, inserting an end section of the filtering membrane from the opening section, and fixing the filtering membrane to the housing by the fixing resin while maintaining the end section of the filtering membrane opening. According to such a manufacturing method, it is possible to manufacture a hollow fiber membrane module efficiently in which there are few cases in which the filtrating membrane is broken or crushed.

A third aspect of the present invention is a hollow fiber membrane flat module in which both ends of hollow fiber membrane bundle which are formed by bundling a plurality of hollow fiber membrane as a sheet are fixed to a housing by a fixing resin while maintaining an opening condition in an opening end section in the follow fiber membrane, the housing is provided with a slit opening section through which an end section of the hollow fiber membrane bundle is inserted into the housing and a weirs which are formed on both sides of the opening section so as to be parallel with the opening section, and the weir is provided with a weir body and a bending section which bends from the tip of the weir body toward thereoutside. In such a hollow fiber membrane module, it is possible to remove almost of the defect potting which is caused by factors such a an inaccuracy in the dimension of the housing and a fall of the hollow fiber. In addition, such a hollow fiber membrane module is superior in the anti-pressure characteristics because the thickness of the fixing resin is uniform.

Also, it is preferable that the height of the weir body in the hollow fiber membrane module is in a range of 10 to 90% of entire height of the weir. In such a hollow fiber membrane module, it is possible to obtain a sufficient thickness in the fixing resin; thus, it is possible to maintain the anti-pressure characteristics in the hollow fiber membrane module.

Also, it is preferable that, in a hollow fiber membrane module, a ratio between an interval between a tip section in a weir and a tip section in another weir and an interval between a base tip section of a weir and another base tip section of a weir is in a range of 10:9 to 2:1. In such a hollow fiber membrane module, it is possible to pour the fixing resin into the resin pouring section easily and reduce the consumed amount of the necessary fixing resin.

Also, it is preferable that a thickness in the opening section in the hollow fiber membrane module is in a range of 0.1 to 20 mm. In such a hollow fiber membrane module, it is possible to hold the hollow fiber membrane. Thus, it is possible to obtain a sufficient effective membrane area; thus, it is possible to maintain the anti-pressure characteristics.

A fourth aspect of the present invention, in a hollow fiber membrane module, it is characterized in that an end cap is attached to at least an end of the housing in a water-tight manner in which an inner path which is a path for a processed water from the hollow fiber membrane is formed, and at least an edge end section of the hollow fiber membrane is fixed to the housing by a fixing member made of a fixing resin in a water-tight manner. Also, it is characterized in that the fixing member fixes the hollow fiber membrane on the housing, and the fixing member fixes the end cap on the housing. Such a hollow fiber membrane module is superior in a mechanical strength in an area in which the housing and the end caps are attached together.

Also, it is preferable that, in a follow fiber membrane module, the end cap is provided with a small lid section which is inserted in the inner path in the housing, a large lid section which contacts an end surface of the housing, and a connecting section for connecting the small lid section and the large lid section such that an area in a cross section orthogonal to a longitudinal direction of the housing is smaller than an area of the small lid section, and the fixing member is filled in a resin pouring space which is formed between an outer periphery wall of the connecting section of the end cap and an inner periphery wall of the housing. In such a hollow fiber membrane module, the end caps are prevented from being removed from the housing; thus, the end caps are fixed to the housing reliably.

Also, a fourth aspect of the present invention is characterized in that a method for manufacturing a hollow fiber membrane module has steps for containing the opening end section of the hollow fiber membrane in the housing from the opening section which is formed on a side of the housing, attaching the end cap on the end section of the housing, pouring a liquid fixing resin into the resin pouring section which is formed in a periphery of the opening section, fixing the hollow fiber membrane on the housing, pouring a fixing resin into the resin pouring space which is formed between the housing and the end cap, and fixing the end cap on the housing. According to such a method for manufacturing a hollow fiber membrane module, it is possible to manufacture a hollow fiber membrane module having a superior mechanical strength in an area in which the housing and the end caps are attached together easily and efficiently.

BEST MODE FOR CARRYING OUT THE INVENTION

Here, the present invention is further explained in detail.

First Aspect of the Hollow Fiber Membrane Module

Figure 1:
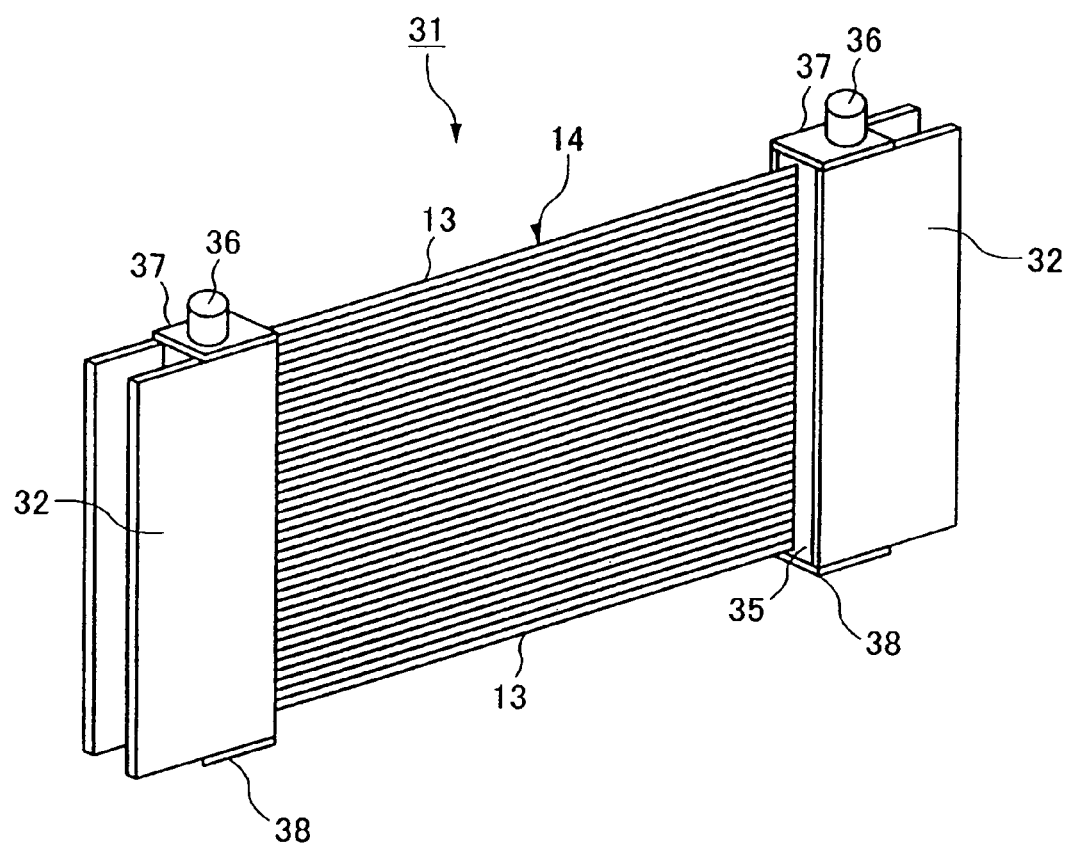
FIG. 1 is a perspective view for an example of a hollow fiber membrane module according to the present invention.
Figure 2:
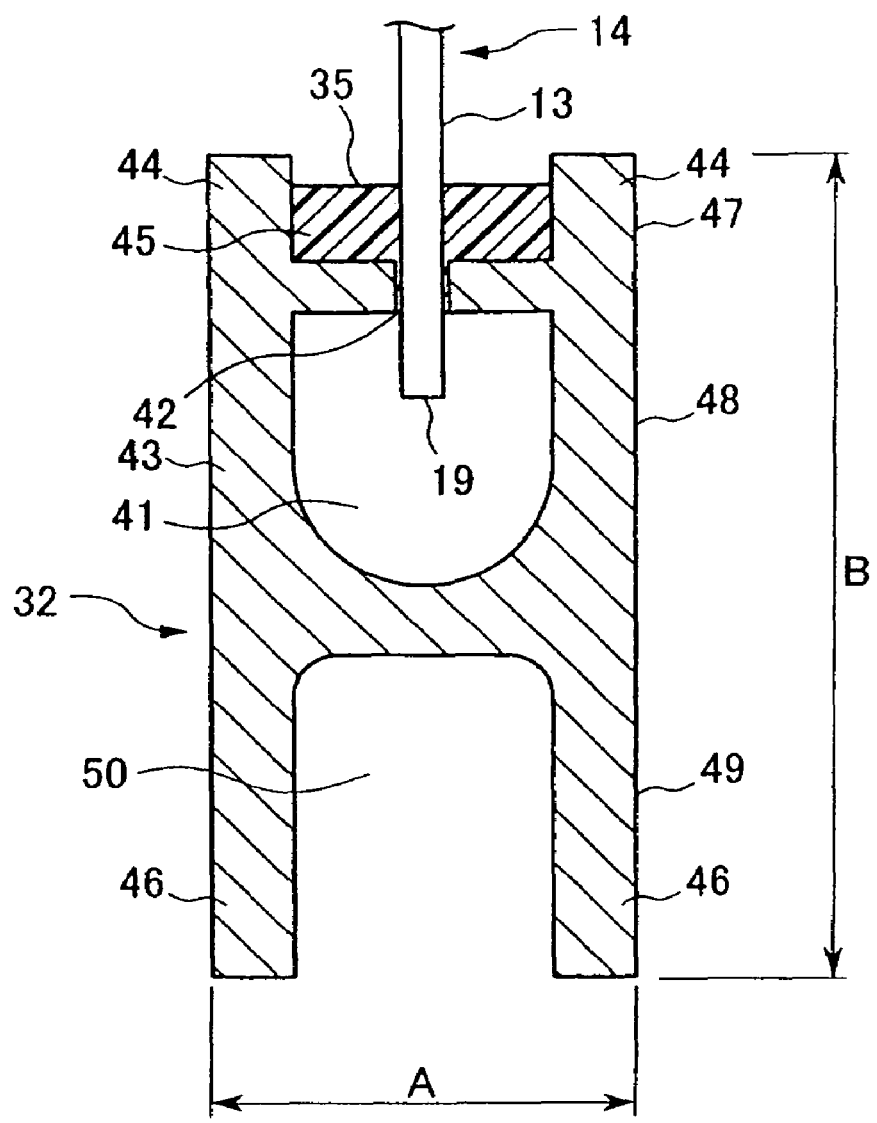
FIG. 2 is a cross section of a housing in the hollow fiber membrane module shown in FIG. 1.

FIG. 1 is a perspective view showing an example for a hollow fiber membrane module according to the present invention. FIG. 2 is a cross section in the housing in the hollow fiber membrane module shown in FIG. 1.

A hollow fiber membrane module 31 approximately comprises a pair of housings 32, a hollow fiber membrane bundle 14 in which a plurality of hollow fiber membranes 13 are bundled as a sheet, an end cap 37 which is attached on an end of the housing 32 having a processed-water exit 36, and an end cap 38 which is attached on another end of the housing 32 without a processed-water exit. Here, the hollow fiber membrane bundle 14 is fixed on the housing 32 by the fixing resin 35 under condition that the hollow fiber membrane bundle 14 is inserted in the housing 32 and an opening end section 19 in the hollow fiber membranes 19 is maintained open.

The housing 322 is a hollow columnar member having an H-letter shape which is provided with a hollow inner path 41 which is formed in the housing 32, a slit opening section 42 which is formed in a longitudinal direction on a surface of the housing unit 43, weirs 44 which are disposed unitarily with the housing unit 43 on both sides of the opening section 42 in parallel with the opening section 42, a resin pouring section 45 which is sandwiched by the weirs 44, and two lanes of reinforcing rib sections 46 which are formed unitarily with the housing unit 43 in a longitudinal direction opposite to the opening sections 42 which sandwich the inner path 41. Here, the weirs 44 are formed in parallel each other such that a side surface 47 on the weir 44 and a side surface 48 of the housing unit 43 are aligned. Also, the reinforcing rib sections 46 are formed in parallel each other such that a side surface 48 on the housing unit 43 and a side surface 49 of the reinforcing rib section 46 are aligned.

In the present invention, it is necessary that a maximum width (A) in an orthogonal direction to a longitudinal direction of the hollow fiber membrane 13 is no longer than 25 mm in a cross section which is orthogonal to a longitudinal direction of the housings 32. It is possible to enhance the integration ratio of the hollow fiber membrane module 31 when a distance between the housings 32 in the hollow fiber membrane module 31 is maintained constantly in a preferable range and the maximum width A in the housing 32 is set no higher than 25 mm, and a plurality of hollow fiber membrane modules 31 are disposed and integrated so as to be a unit. It is preferable that the maximum width A is not higher than 20 mm. It is more preferable that the maximum width A is not higher than 15 mm.

Also, for a purpose to design the hollow fiber membrane module more compactly, it is preferable that a cross section in a surface orthogonal to the longitudinal direction in the housing 32 should be not larger than 5 cm². It is more preferable that a cross section in a surface orthogonal to the longitudinal direction in the housing 32 should be not larger than 4.5 cm². A cross section in the housing 32 shown in FIG. 2 is represented by a product of a maximum width a in a direction orthogonal to the longitudinal direction of the hollow fiber membranes 13 in a cross section orthogonal to the longitudinal direction in the housing 32 and a maximum width B in the longitudinal direction in the hollow fiber membranes 13. Here, the cross section in the housing 32 includes a cross section in the hollow fiber membranes 13 in the housing 32, a resin pouring section 45 in which a fixing resin 35 is poured, and a concave section 50 which is sandwiched by the inner path 41 and the reinforcing rib section 46 in addition to a cross section in the housing 32 itself.

In the present invention, it is necessary that a maximum deflection in the housing 32 is not larger than 1% of the distance between two housings 32. By setting the maximum deflection in the housing 32 to be not larger than 1% of the distance between two housings 32, it is possible to restrict the deflection in the housing 32 in the longitudinal direction of the hollow fiber membrane 13 which is caused by factors such as an air bubble which is generated in an air-diffusing pipe when a highly contaminated water is filtrated by using a hollow fiber membrane module unit which is formed by the hollow fiber membrane module 31. By doing this, it is possible to restrict the sag in the hollow fiber membrane; therefore, it is possible to prevent the entanglement of the hollow fiber membranes 13 in the neighboring hollow fiber membrane modules 31.

Here, the maximum deflection in the housing 2 is measured by a following method for measuring the deflection.

Method for Measuring the Deflection

Figure 3:
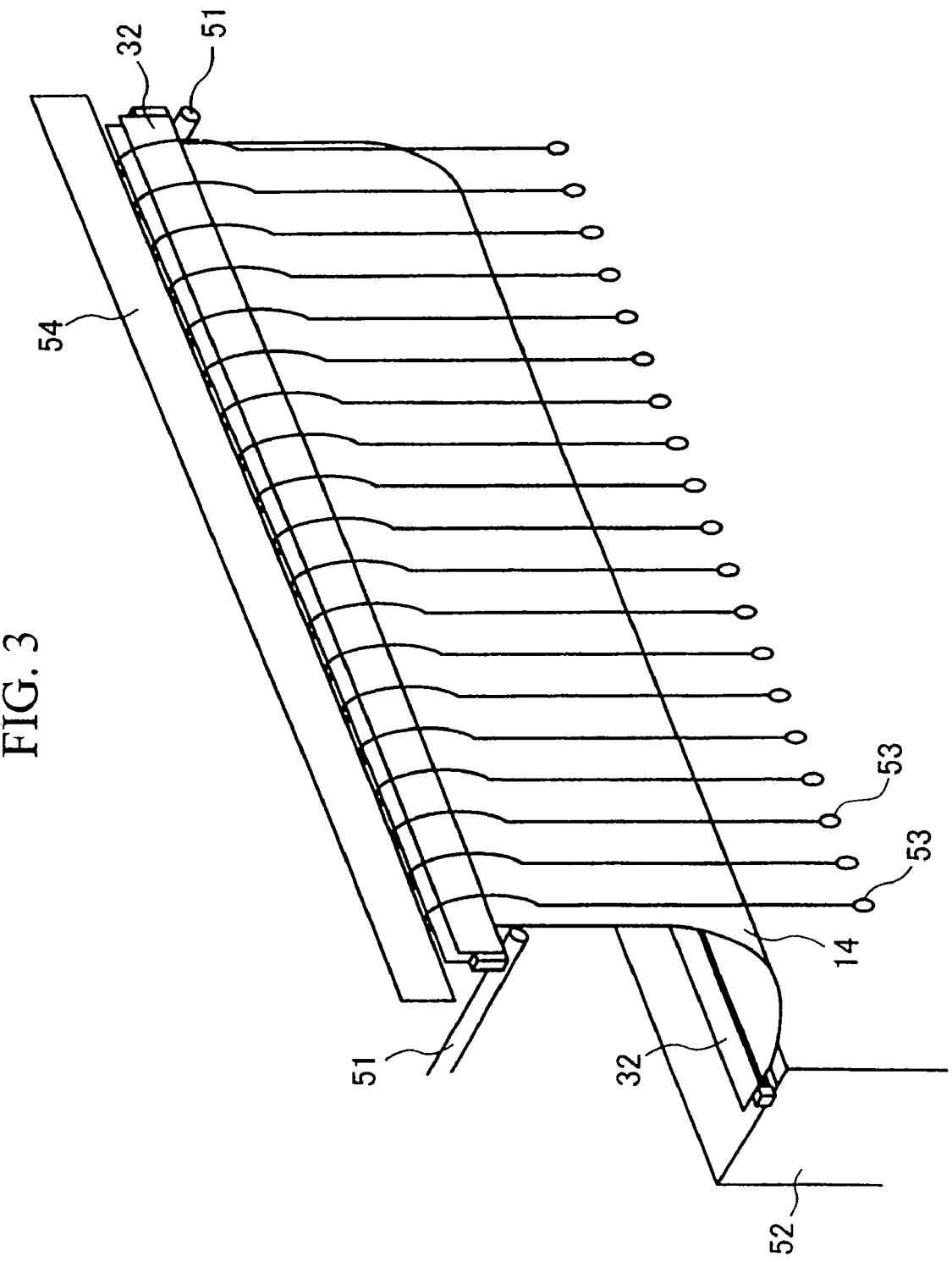
FIG. 3 is a perspective view for explaining a method for measuring a deflection in the housing.

First, as shown in FIG. 3, both ends of the housing 32 which is to be measured are supported by a supporting bars 51, 51 such that a hollow fiber membrane 14 is disposed downwardly, and another housing 32' is put on a base 52 such that a mass of the another housing 32' is not applied to the housing 32 which is to be measured. Next, 0.05 kg of weights 53, 53 are suspended in every 5 cm of intervals between an end of the housing 32 which is to be measured to the other end of the housing 32 which is to be measured. After that, a straightedge 54 is applied on an upper surface of the housing 32 which it to be measured, a distance between the uppers surface of the housing 32 which is to be measured and the straightedge 54. Finally, a maximum value of the above distance is defined as a maximum deflection.

Also, a distance between the two housings represents a maximum interval between the neighboring housings 32 such that the hollow fiber membrane bundle 14 does not bend. That is, a distance between the two housings represents a length of the hollow fiber membrane bundle 14 which is disposed between the two housings 32.

An opening section 42 is a slit hole through which an end section of the hollow fiber membrane bundle 14 is inserted in the inner path 41. It is preferable that a width in the slit of the opening section 42 which is formed in the housing 32 is determined so that the hollow fiber membrane bundle 14 can be inserted from outside of the housing 32 and the hollow fiber membrane 13 can be supported by a pressing force which is sufficiently gentle so as not to crush the hollow fiber membrane 13. The slit width in the opening section 42 differ according to the outer diameter of the hollow fiber membrane 13, that is, the slit width in the opening section 42 is not limited in a specific value. For example, the slit width in the opening section 42 should preferably be in a range of 0.3 to 5 mm. A weir 44 is disposed so as to prevent an overhang of the fixing resin 35. The height of the weir 44 should preferably be high such that an anti-pressure characteristics which is required for the hollow fiber membrane module 13 and a stability in a fixed section of the hollow fiber membrane bundle 14 are satisfied by the fixing resin 35 which is poured thereinto. That is, the height of the weir 44 should preferably be in a range of, for example, 1 to 20 mm. More preferably, the height of the weir 44 should be in a range of 1 to 15 mm.

By the reinforcing rib section 46, it is possible to design a strength in the housing 32 at any value so as to set a the maximum deflection in the housing 32 to be not higher than 1% of the distance between the two neighboring housings 32 in the hollow fiber membrane module 32. A shape of the reinforcing rib section 46 is not limited in a shape which is shown in the drawings. Any shape can be used as long as it improves a strength of the housing 32 against the deflection.

A length of the housing 32 in the longitudinal direction is determined preferably in a range by which the maximum deflection satisfies the above conditions. In order to enhance the integration ratio of the hollow fiber membrane module 31, a length of the housing 32 should preferably be no less than 500 mm. More preferably, a length of the housing 32 should be no less than 1000 mm.

Figure 4:
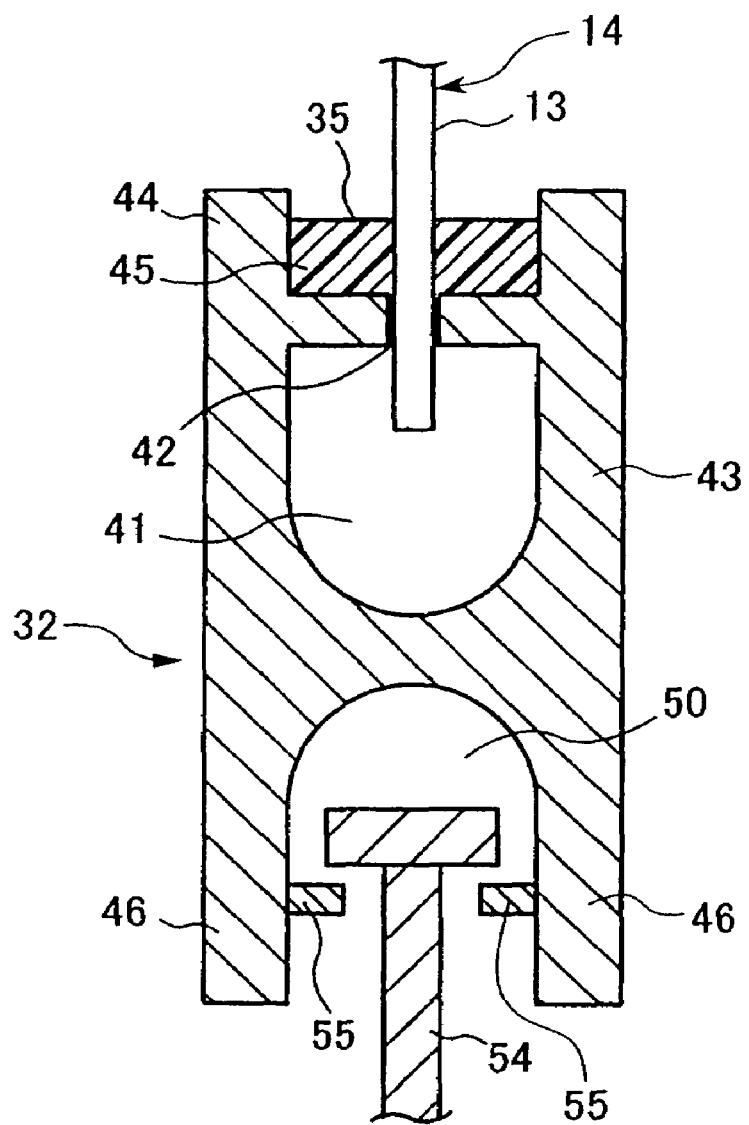
FIG. 4 is a cross section in the housing as other example for the hollow fiber membrane module according to the present invention.

However, there is a case in which it is very difficult to regulate the maximum deflection with the above range when a length of the housing 32 in the longitudinal direction is longer than 2000 mm. In such a case, as shown in FIG. 4, it is possible to dispose an engaging section 55 which is formed by two convex lanes for engaging the external supporting member 54 having T-letter cross section on an inner surface of the reinforcing rib section 46 which faces the concave section 50 in the longitudinal direction of the housing 32. By disposing such an engaging section 55, it is possible to support and strengthen the housing 32 by the external supporting member 54; thus, it is possible to reduce the deflection in the housing 32. Here, the external supporting member 54 is fixed on a tank on which the hollow fiber membrane module unit is disposed, a frame member (now shown in the drawing) which surrounds the hollow fiber membrane module unit.

It is sufficient if the engaging section 55 has a function for supporting the hollow fiber membrane module 31 which forms the hollow fiber membrane module unit by a fixing section except the hollow fiber membrane module unit. The shape and the dimension of the engaging section 55 is not limited specifically. As shown in FIG. 4, the engaging section 55 is formed to be two concave lanes which expand in the longitudinal direction of the housing 32 so as to face each other such that the two concave lanes sandwich the external supporting member 54. Thus, it is possible to connect the external supporting member 54 having a T-letter cross section and the housing 32 reliably. Also, it is possible to attach and detach the external supporting member 54 with the housing 32. Also, for a method for fixing the engaging section 55, various methods can be used such as a method in which the engaging section 55 is fixed to the reinforcing rib section 46 in the housing 32 by using a bolt and a nut, a method in which the engaging section 55 is fixed to the reinforcing rib section 46 by a bonding operation and a melt-welding operation.

For a member for the housing 32, any members which have a physical strength and durability can be used. For example, it is possible to use polycarbonate, polysulfone, polyolefin, polyvinyl chloride, acrylic resin, ABS resin, modified PPE (polyphenylene ether). If it is necessary to burn the housing after it is used, it is preferable to use a hydrocarbon resin such as a polyolefin which can be completely burnt without generating a poisonous gas when it is burnt.

Here, a housing which is used in the hollow fiber membrane module according to the present invention is not limited to the structures shown in the drawings as long as the housing is provided with a resin pouring section in which the fixing resin is poured, an opening section through which an end section of the hollow fiber membrane bundle is inserted, and an inner path which communicates to the hollow fiber membrane and satisfies the required characteristics. Also, if the housing has sufficient strength against the deflection, it is not necessary to dispose a reinforcing rib section.

Also, a shape of the cross section in the housing is not limited to an H-letter shape as shown in the drawing. For example, it is possible to form the cross section in the housing in various shapes such as cylindrical, polygonal, and U-letter shape. Here, the shape in the cross section of the housing should preferably be in an approximate H-letter because of following three reasons. First, it is because an efficiency in handling the hollow fiber membrane module 31 in the manufacturing processes can be improved by sandwiching the hollow fiber membrane bundle 14 by the opening section 42 in the housing 32. Second, it is because it is possible to set the high integration ratio of the hollow fiber membrane module 31 in the hollow fiber membrane module unit in a designing process. Third, it is because the strength in the housing 32 against the deflection can be enhanced by disposing the reinforcing rib section 46.

As explained above, an efficiency in the handling in the manufacturing processes for the hollow fiber membrane module can be improved by using the housing 32 having the above features when the hollow fiber membrane module unit which is formed by the hollow fiber membrane module 31. Simultaneously, it is possible to set the integration ratio of the hollow fiber membrane module 31 in a designing process.

For a hollow fiber membrane 13, various hollow fiber membranes which are based on cellulose, polyolefin, polyvinyl alcohols PMMA (polymethyl methacrylate), polysulfone, and a fluororesin such as PVDF (polyvinylidene fluoride) and PTFE (polytetrafluoroethylene). Especially, it is preferable to use the hollow fiber membrane which is formed by a member having tensile strength and elongation such as a polyethelene.

Here, a diameter in a filter hole, a vacancy ratio, thickness of membrane, and outer diameter of the hollow fiber membrane are not limited specifically as long as the hollow fiber membrane can be used for a filtrating membrane. For example, the outer diameter of the filtrating hole may be in a range of 20 to 2000 ·mu·m. The hole diameter may be in a range of 0.001 to 1 ·mu·m. The vacancy ratio may be in a range of 20 to 90%. The thickness of the membrane may be in a range of 5 to 300 ·mu·m.

For a hollow fiber membrane bundle 14, a hollow fiber membrane bundle which is formed by drawing a hollow fiber membrane 13 simply can be used. Also, from a manufacturing point of view for the hollow fiber membrane module 31, it is preferable to use a hollow fiber membrane bundle which is a knitting fabric by using the hollow fiber membrane 13 as a weft or a hollow fiber membrane bundle which is formed by layering a plurality of the above knitting fabrics. Here, the hollow fiber membrane bundle which is formed by layering a plurality of the knitting fabrics includes a hollow fiber membrane bundle which is formed by folding the knitting fabrics in an appropriate length without cutting the knitting fabrics. The knitting fabric is layered (folded) according to the thickness of the hollow fiber membrane 13 and the thickness of the knitting fabric such as a total number of fibers which are yarned in the hollow fiber membrane 13 for forming the knitting fabric. Ordinarily, it is preferable that the knitting fabric is layered (folded) not more than five times.

For a fixing resin 35, it is possible to use, for example, epoxy resin, unsaturated polyester resin, polyurethane resin, silicone resin, hotmelt resin. It is possible to choose either of them preferably. Also, the viscosity of the fixing resin 35 under condition that the fixing resin 35 is not solidified is not limited specifically. It is preferable that the viscosity of the fixing resin 35 should be in a range of 500 to 500 mPa.multidot.s. More preferable, the viscosity of the fixing resin 35 should be in a range of 2000 to 3000 mPa.multidot.s. As long as the viscosity of the fixing resin 35 under condition that the fixing resin 35 is not solidified is not less than 500 mPa.multidot.s, the fixing resin 35 does not flow to the opening end section 19 in the hollow fiber membrane 13; thus, the fixing resin 35 does not seal the opening end section 19. Also, as long as the viscosity of the fixing resin 35 under condition that the fixing resin 35 is not solidified is not more than 3000 mPa.multidot.s, the fixing resin 35 can permeate among a plurality of hollow fiber membrane 13 easily.

The fixing resin 35 is solidified in the opening section 42 having a narrow width and in a resin pouring section 45 having a large width; therefore, the cross section of the fixing resin is in a convex shape. By forming the cross section in the fixing resin 35 in a convex shape, it is possible to prevent a damage on the housing 32 caused by contacting the hollow fiber membrane 13 to the housing 32.

It is preferable that an inner path 41 can flow a sufficient amount of water when the hollow fiber membrane bundle 14 is fixed to the housing 32 by the fixing resin 35. Also, it is preferable that an inner path 41 can satisfy physical characteristics such as an anti-pressure characteristics which are required in its purpose.

In the hollow fiber membrane module 31 which is explained as above, the maximum deflection in the housing 32 is not more than 1% of the distance between the two housings; it is possible to regulate the maximum width A in a direction which is orthogonal to the longitudinal direction of the hollow fiber membrane 13 to be not longer than 25 mm in a cross section which is orthogonal to the longitudinal direction of the housing 32 and enhance the integration ratio of the hollow fiber membrane module per a unit volume of the hollow fiber membrane module unit. Also, it is possible to restrict the entanglement of the hollow fiber membranes without causing the deflection in the housing due to factors such as an air bubble.

Next, a method for manufacturing the hollow fiber membrane module 31 is explained.

First, an end section of the hollow fiber membrane 13 which forms the hollow fiber membrane bundle 14 is cut to be opened in advance.

Next, an end section of the hollow fiber membrane bundle 14 of which opening end section 19 in the hollow fiber membrane 13 is cut is inserted in the opening section 42 in the housing 32 such that the opening end section 19 in the hollow fiber membrane 13 is disposed in the inner path 41 in the housing 32. Here, if a slit width in the opening section 42 is too narrow to insert the hollow fiber membrane bundle 14, it may be possible to use a method for widening the opening section 42 when an end section of the hollow fiber membrane bundle 14 is inserted as explained later.

After the end section of the hollow fiber membrane bundle 14 is contained in the housing 32, a liquid fixing resin 35 is filled in the resin pouring section 45 and the opening section 42 from the outside of the housing 32 while maintaining the opening end section 19 opened in the hollow fiber membrane 13. The fixing resin 35 is solidified; thus, the hollow fiber membrane bundle 14 is fixed in the housing 32, and a hollow fiber membrane module 31 can be obtained.

When the fixing resin 35 is poured into the resin pouring section 45 and the opening section 42, it is preferable to use a method in which the hollow fiber membrane bundle 14 is opened by blowing an air to the hollow fiber membrane bundle 14 such that the fixing resin 35 prevails sufficiently among a plurality of hollow fiber membranes 13 which form the hollow fiber membrane bundle 14. Here, a method in which the hollow fiber membrane bundle 14 is opened is not limited to the above method. It is possible to use other method preferably.

Also, it is preferable that the amount of the fixing resin 35 is determined according to a shape of the housing 32 such that the fixing resin 35 is poured within a range which can be stopped by the weir 44.

Here, in a method for manufacturing the hollow fiber membrane module 13 as explained for an example, and end section of the hollow fiber membrane 13 is cut to be opened in advance, and the fixing resin 35 is poured while maintaining the opening end section 19 to be opened in the hollow fiber membrane 13. However, a method for manufacturing the hollow fiber membrane module according to the present invention is not limited to the above method. For example, it is possible to propose a method in which an end section of the hollow fiber membrane bundle 14 of which end section of the hollow fiber membrane 13 is not cut in advance is inserted in the housing 32, the fixing resin 35 is poured and solidified such that the fixing resin 35 does not overflow the inner path 41 in the housing 32 so as to cover the entire end section of the hollow fiber membrane 13, the fixing resin 35 in the inner path 41 is cut together with the end section of the hollow fiber membrane 13; thus, an end section of the hollow fiber membrane 13 is opened.

Figure 5:
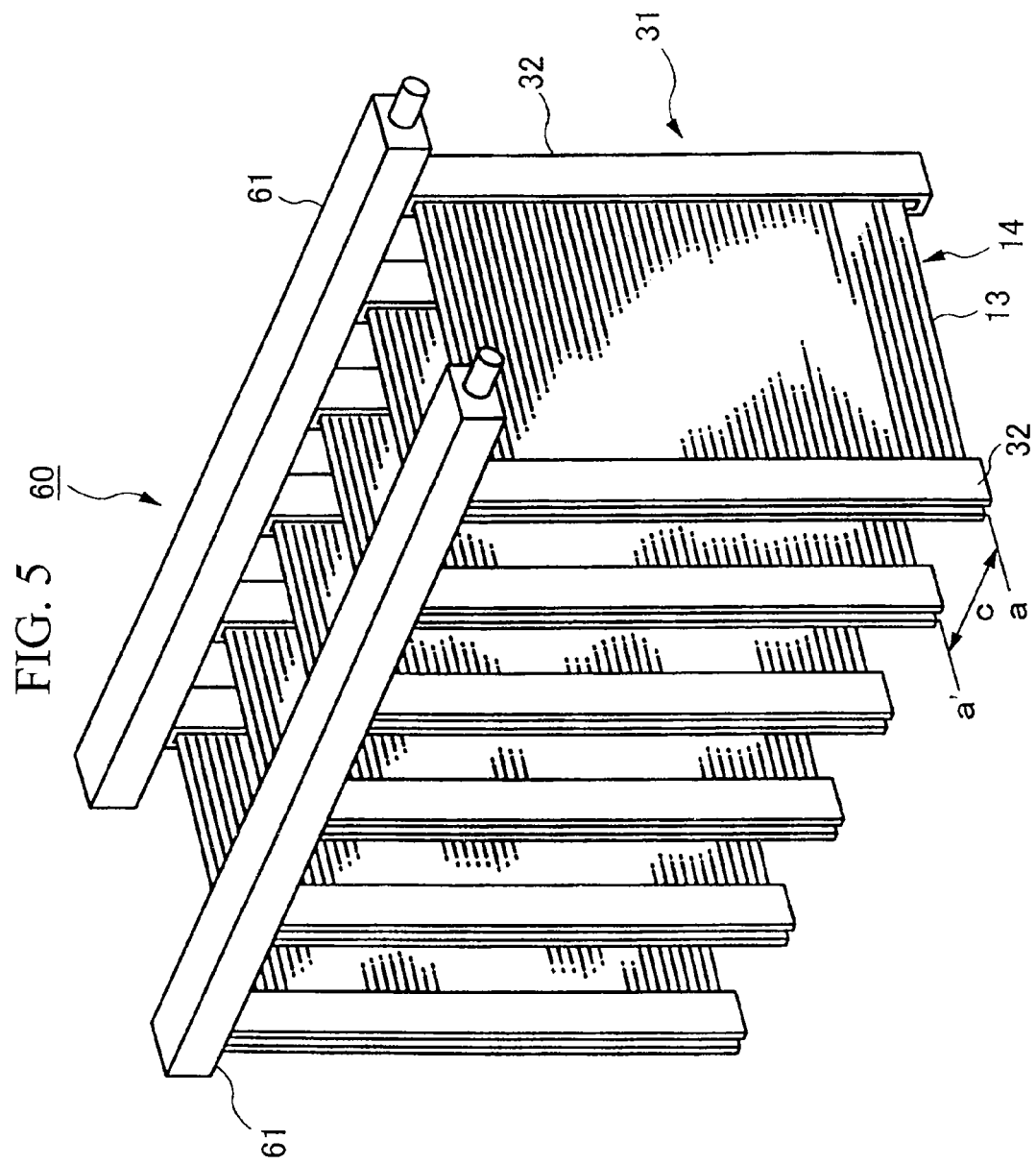
FIG. 5 is a perspective view showing an example for the hollow fiber membrane module unit according to the present invention.

FIG. 5 shows an example for the hollow fiber membrane module unit according to the present invention. In the hollow fiber membrane module unit 60, a plurality of the hollow fiber membrane modules are disposed, and the housing 32 is disposed to connect thereto by a water-collecting header 61 unitarily.

Figure 6:
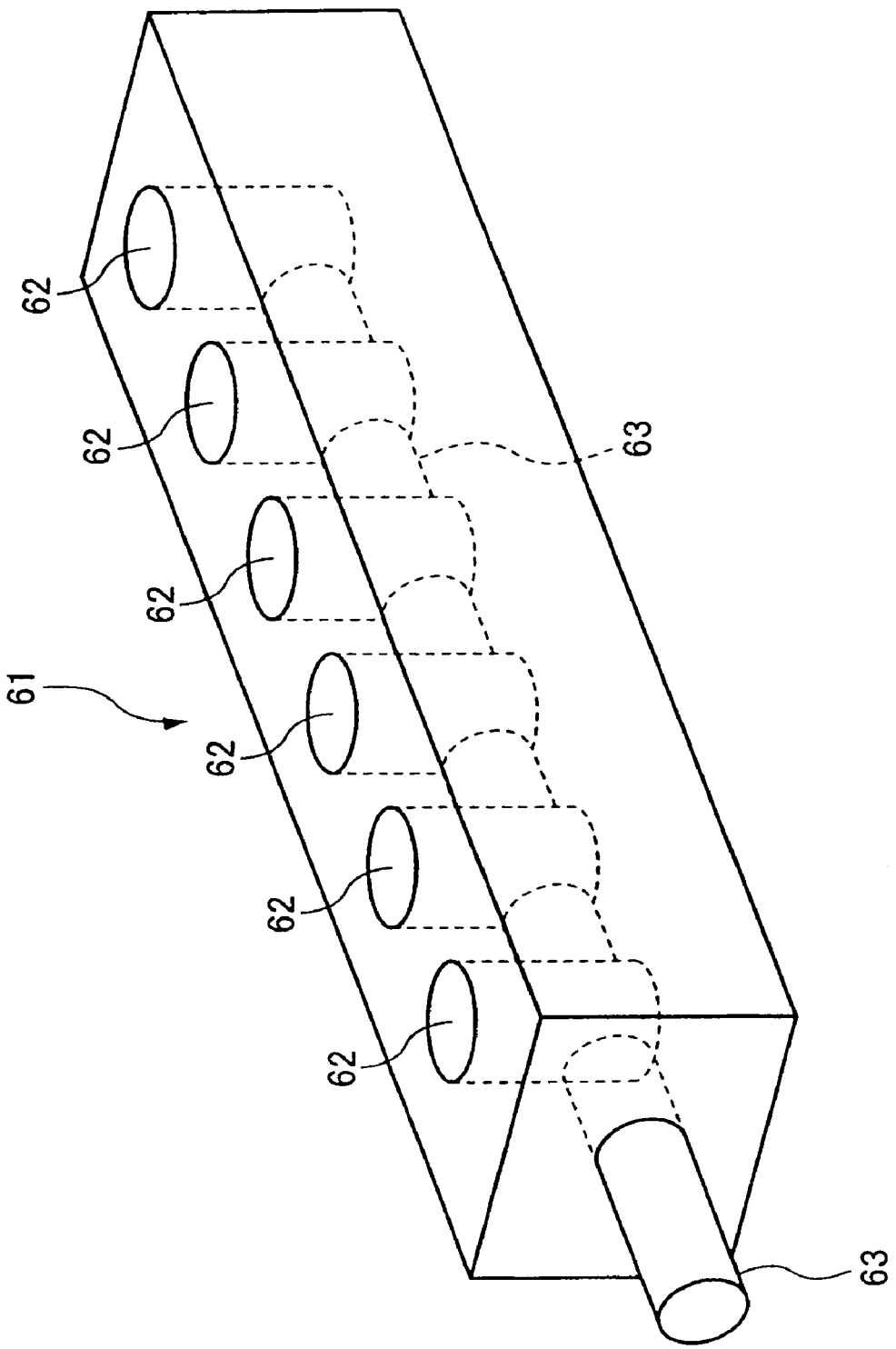
FIG. 6 is a perspective view showing a water-collecting header which is used in the hollow fiber membrane module unit shown in FIG. 5.

FIG. 6 shows an example of the water-collecting header 61 in the hollow fiber membrane module unit 60. The water-collecting header 61 having a cylindrical shape is provided with a plurality of connecting holes for connecting to the processed-water exit 36 in the end cap 37 and a water-collecting path 63 for flowing a filtrating water thereinside. The connecting hole 62 connect to the hollow fiber membrane module 31, 31 so as to be formed unitarily. Also, the water-collecting path 63 communicate to the outside of the water-collecting header 61 so as to be connected with a water pump (not shown in the drawing). Here, it is preferable to use a manifold water-collecting header 61 because it is possible to connect a plurality of hollow fiber membrane modules 31 unitarily and easily so as to be fixed. There is no specific limitation to a structure of the water-collecting header 61 as long as it is possible to extract the filtrated water from the hollow fiber membrane modules 31, 31.

Also, the hollow fiber membrane module unit 60 shown in FIG. 5 is formed by disposing the edge end section of the housing 32 in the hollow fiber membrane modules 31, 31 by the water-collecting header 61. Also, it may be acceptable the both ends section of the housing 32 are fixed by the water-collecting header 61 in the hollow fiber membrane module unit 60.

It is preferable that the interval (C) between a center (a) in a width direction of the housing 32 in the hollow fiber membrane module 31 in the hollow fiber membrane module unit 60 and a center (a') in a width direction of the housing in a neighboring hollow fiber membrane module is no longer than 25 mm so as to realize a higher integration ratio. For that purpose, the interval C should more preferably be not longer than 20 mm. Further more preferably, the interval C should be not longer than 15 mm. Also, it is preferable that the intervals C among the neighboring hollow fiber membrane modules 31 are uniform so as to realize a uniform effect due to the air bubbling operation.

In the hollow fiber membrane module unit 60, it is possible to chose various factors preferably such as a member for the hollow fiber membrane 13, a number of the hollow fiber membrane modules 31, a dimension of the hollow fiber membrane module 31, a dimension of the hollow fiber membrane module unit 60, and a method for cleaning the hollow fiber membrane according to each condition such as the purpose of usage, a space to be installed, and a filtrating capacity.

In such a hollow fiber membrane module unit 60, a plurality of the above hollow fiber membrane modules 31 are disposed so as to be layered and unified by the water-collecting header 61; it is possible to set a higher integration ratio in a designing process and exchange the hollow fiber membrane module easily.

Second Aspect of the Hollow Fiber Membrane Module

Figure 7:
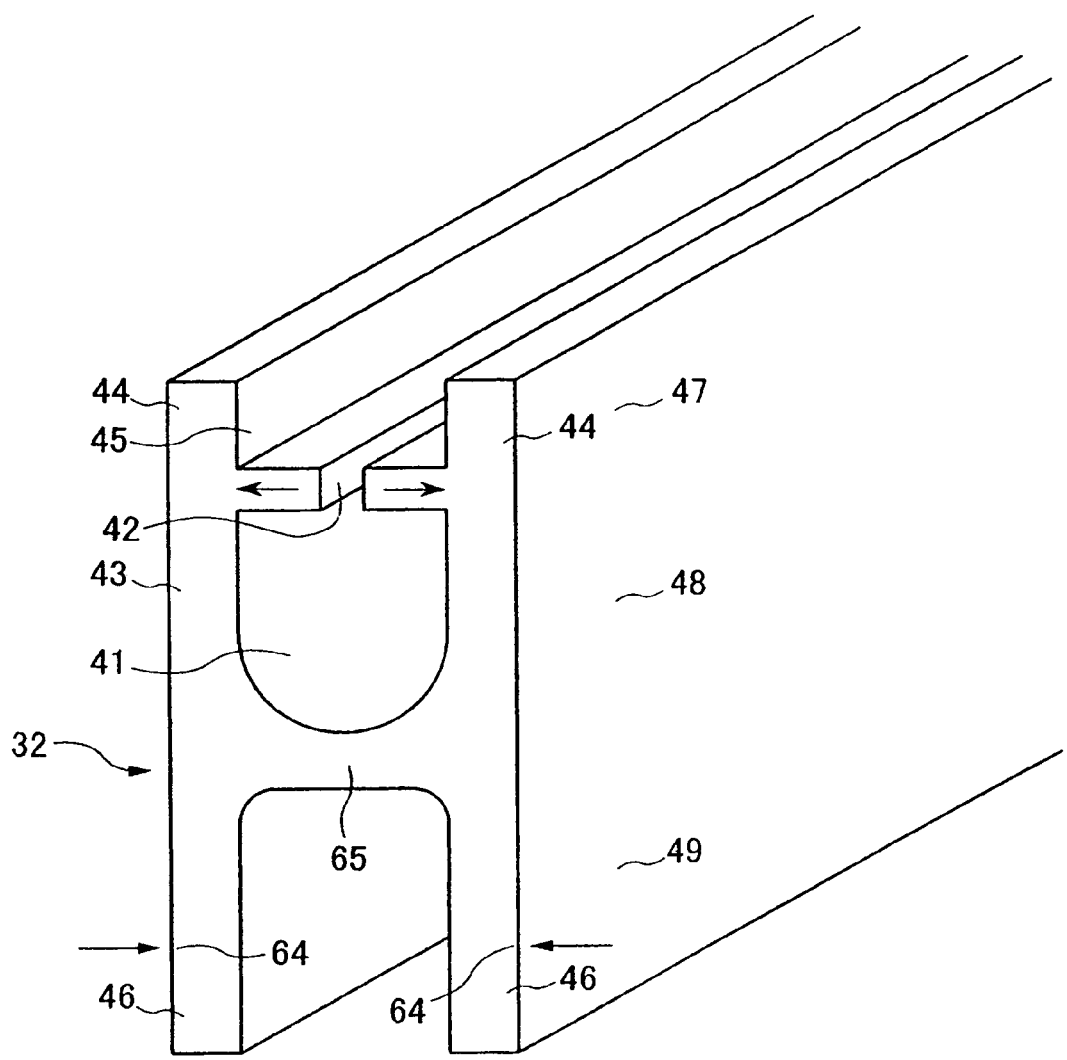
FIG. 7 is a perspective view showing an example for a housing in the hollow fiber membrane module according to the present invention.

FIG. 7 shows a membrane module housing which is used in a second aspect of the hollow fiber membrane module according to the present invention. The housing 32 is a hollow columnar member having an H-letter shape which is provided with a hollow inner path (hollow section) 41 which is formed in the housing 32, a slit opening section 42 which is formed on a surface of the housing unit 43 in a longitudinal direction, weirs 44 which are disposed unitarily with the housing unit 43 on both sides of the opening section 42 in parallel with the opening section 42, a resin pouring section 45 which is sandwiched by the weirs 44, and two lanes of reinforcing rib section 46 (convex lane sections) which are formed unitarily with the housing unit 43 in the longitudinal direction opposite to the opening section 42 which sandwiches the inner path 41. Here, the weirs 44 are formed so as to be in parallel each other such that a side surface 47 of the weir 44 and a side surface 48 of the housing unit 43 are aligned. Also, the reinforcing rib sections 46 are formed so as to be in parallel each other such that a side surface 48 of the housing unit 43 and a side surface 49 of the reinforcing rib section 46 are aligned.

In this housing 32, the opening section 42 applies a pressure on the reinforcing rib section 46 horizontally from the housing 32. By doing this, a side surface on the reinforcing rib section 46 on which a pressure is applied becomes a power point 64. Also, an approximate center of a wall surface of the housing unit 43 which is disposed opposite to the opening section 42 having the inner path therebetween becomes a fulcrum 65. Therefore, the opening section can be widened.

The height of the reinforcing rib section 46 is not limited specifically. The height of the reinforcing rib section 46 is preferably not lower than 5 mm so as to realize a widening function of the opening section 32 by the housing 32. More preferably, the height of the reinforcing rib section 46 is in a range of 10 to 100 mm. If the height of the reinforcing rib section is lower than 5 mm, it is not preferable because it is necessary to apply quite a high pressure for widening the opening section 32. If the height of the reinforcing rib section exceeds 100 mm, it is not preferable because a larger space for installing the housing 32 is necessary when a membrane module is formed to be a unit; thus, the area for the membrane decreases.

The thickness of the wall of the housing unit 43 should be in a preferable range in by which it is possible to satisfy the anti-pressure characteristics for the membrane module because it is possible to increase the width in the opening section 42 by using a wall of the housing 43 as the fulcrum 65 when a pressure is applied on the reinforcing rib section 46. The thickness of the wall of the housing unit 43 is not limited specifically. For example, the thickness of the wall of the housing unit 43 may be in a range of 0.5 to 10 mm.

The height of the weir 44 should preferably be high such that an anti-pressure characteristics which is required for the hollow fiber membrane module and a stability in a fixed section of the filtrating membrane are satisfied by the fixing resin 35 which is poured thereinto. That is, the height of the weir 44 should preferably be in a range of, for example, 1 to 50 mm.

It is preferable that a width in the slit of the opening section 42 which is formed in the housing 32 is determined so that the filtrating membrane can be inserted from outside of the housing 32 and the filtrating membrane can be supported by a pressing force which is sufficiently gentle so as not to crush the filtrating membrane. The optimal slit width in the opening section 42 differs according to the filtrating membrane to be used; thus, the optimal slit width in the opening section 42 is not limited specifically. For example, the optimal slit width in the opening section 42 may be in a range of 0.3 to 5 mm.

The size of the housing 32 can be adjusted according to factors such as a size of the filtrating membrane to be fixed and a usage of the membrane module.

The membrane module according to the second aspect of the present invention is manufactured such that a pressure is applied to the reinforcing rib section 46 horizontally from the housing 32 so as to widen the opening section 42, and end section of the filtrating membrane is inserted through the opening section 42, and the filtrating membrane is fixed in the housing 32 by the fixing resin 35 while maintaining the end section of the filtrating membrane opened. According to the above method, a filtrating membrane under condition that the opening section 42 is widened; thus, the filtrating membrane is not damaged. Therefore, it is possible to manufacture a membrane module having not breakage and crush in the filtrating membrane efficiently.

Here, it is possible to use a hollow fiber membrane 14 for a filtrating membrane. Also, it is possible to use any member which is formed as a sheet for a filtrating membrane in addition to a hollow fiber membrane bundle. For example, it is possible to use a flat membrane which is made by a single piece of sheet or a plurality of sheets which are layered.

Third Aspect of the Hollow Fiber Membrane Module

Figure 8:
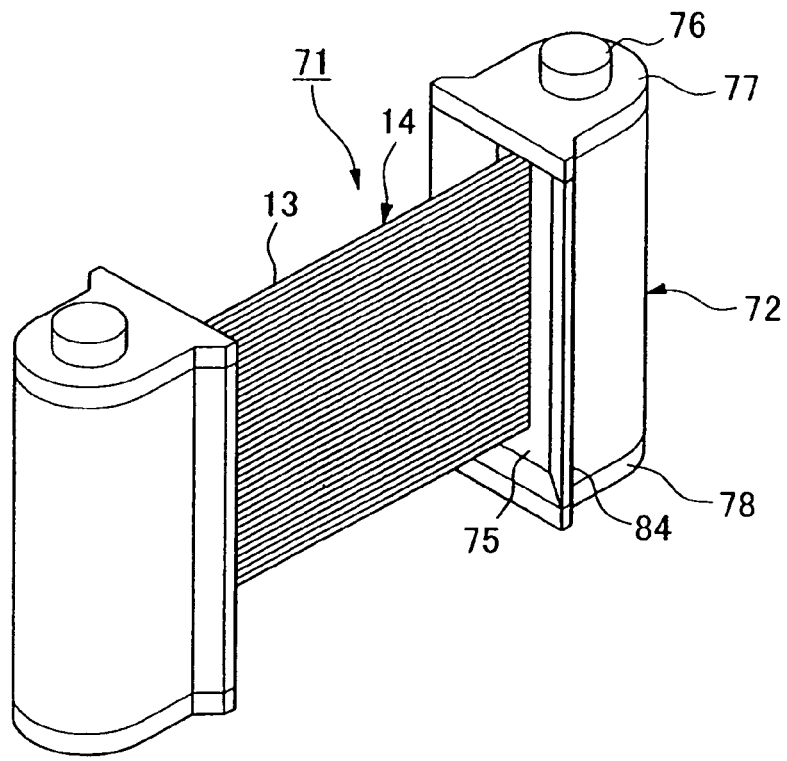
FIG. 8 is a perspective view showing other example for the hollow fiber membrane module according to the present invention.
Figure 9:
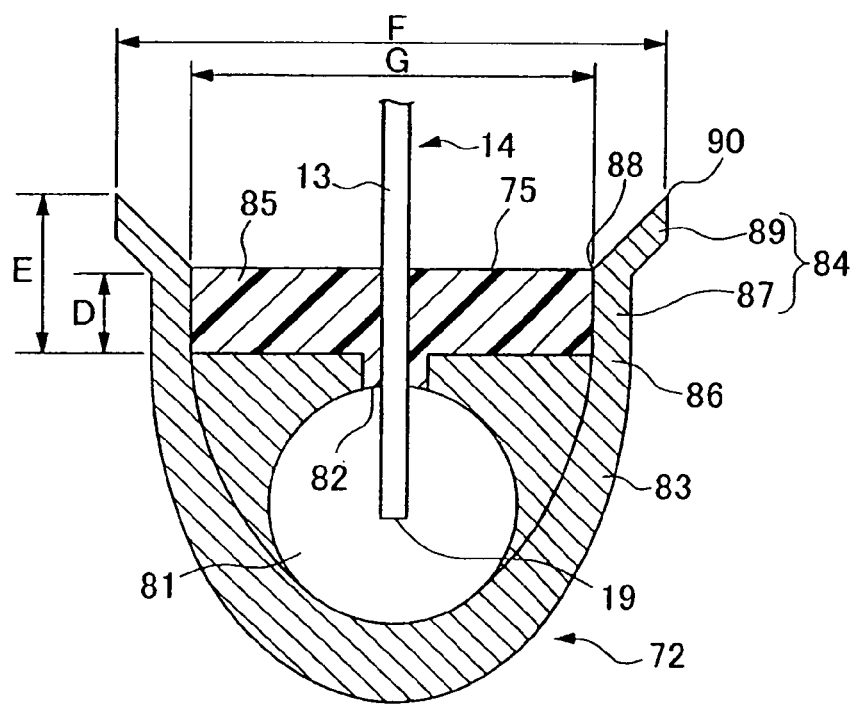
FIG. 9 is a cross section in the housing which is used in the hollow fiber membrane module shown in FIG. 8.

FIG. 8 is a perspective view showing an example for a hollow fiber membrane module according to the present invention. FIG. 9 is a cross section in the housing of the hollow fiber membrane module shown in FIG. 8.

Here, a hollow fiber membrane module 71 is approximately comprises a plurality of housings 72, a hollow fiber membrane bundle 14 in which a plurality of hollow fiber membrane 13 is bundled as a sheet, an end cap 77 having a processed-water exit which is attached on an end of the housing 72, and an end cap 78 which does not have a processed-water exit and is attached to another end of the housing 72. A hollow fiber membrane bundle 14 is fixed on the housing 72 by a fixing resin 75 under condition that the hollow fiber membrane bundle 14 is inserted in the housing 72 and an opening end section 19 in the hollow fiber membrane 13 is maintained opened.

Figure 10:
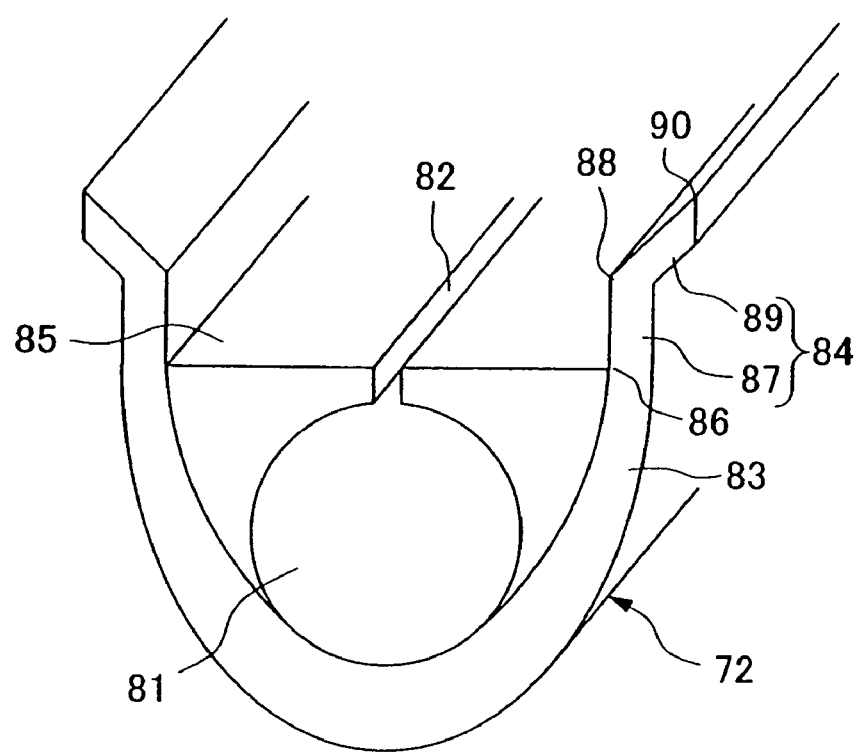
FIG. 10 is a perspective view of the housing which is used in the hollow fiber membrane module shown in FIG. 8.
Figure 11:
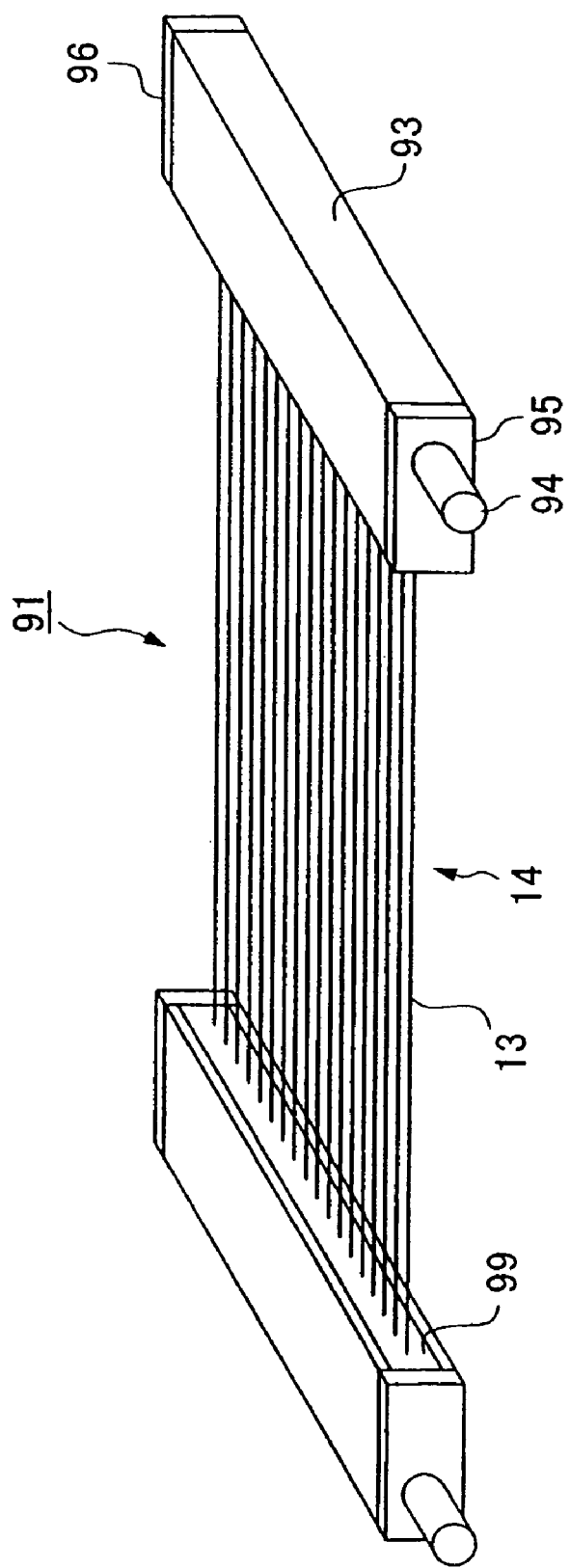
FIG. 11 is a perspective view for showing other example for the hollow fiber membrane module according to the present invention.
Figure 12:
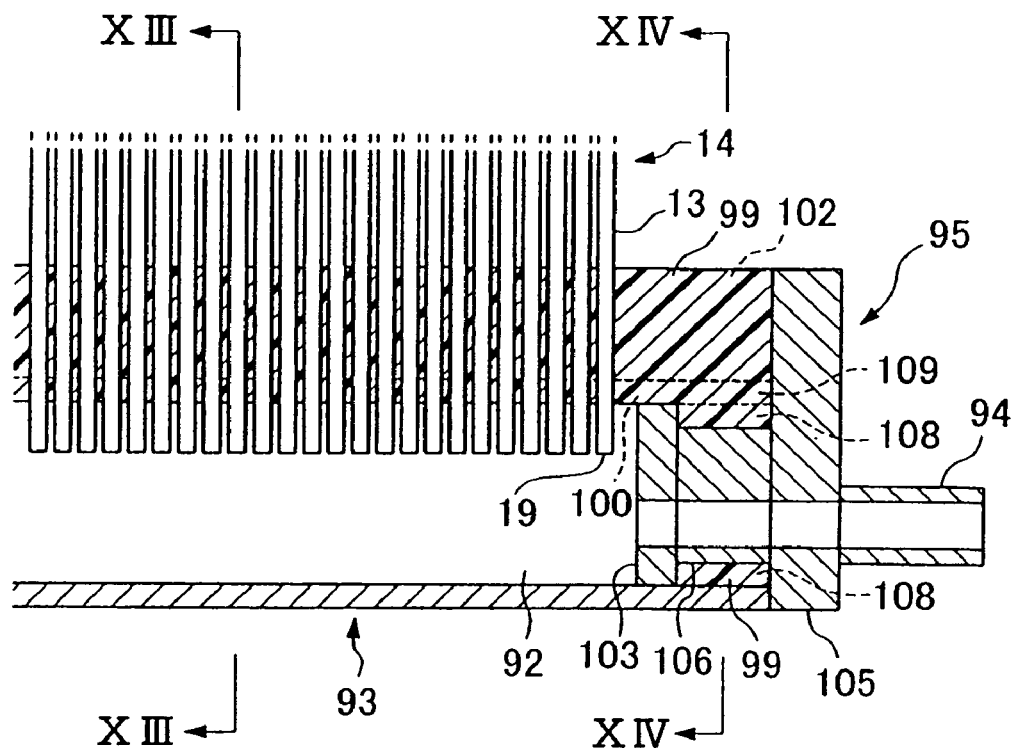
FIG. 12 is a cross section in the housing in the hollow fiber membrane module shown in FIG. 11.
Figure 13:
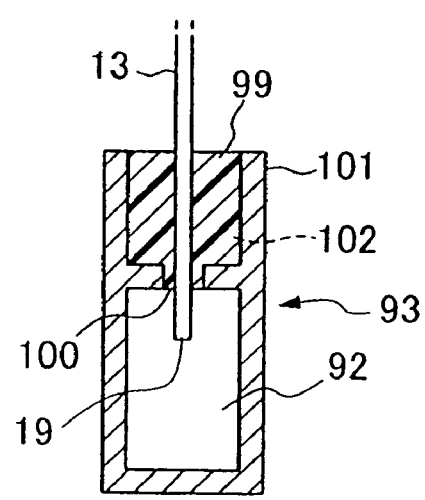
FIG. 13 is a cross section viewed in a line XIII-XIII shown in FIG. 12.
Figure 14:
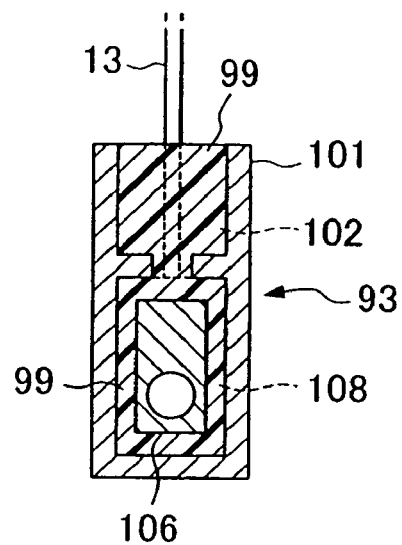
FIG. 14 is a cross section viewed in a line XIV-XIV shown in FIG. 12.

As shown in FIG. 10, the housing 72 is a cylindrical member having a cross section in U-letter shape which is formed by an inner path 81 which is formed in the housing 72, a slit opening section 82 which is formed on a side of the housing 72, weirs 84 which are formed unitarily with a housing unit 83 so as to be parallel with the opening section 82 on both sides of the opening section 82, and a resin pouring section 85 which is sandwiched between the weirs 44. Also, the weirs 84 are disposed approximately in parallel with the hollow fiber membrane 13. The weir 84 is provided with a weir body 87 of which base end section 86 is connected to the housing unit 83 and a bending section 89 which bends from a tip 88 of the weir body 87 toward thereoutside the outside.

The bending section 89 on the weir 84 bends from the tip 88 of the weir body 87 toward the outside. By such a structure, the bending section 89 on the weir 84 restricts non-uniformity in the dimension of the weir 84 which is caused by inaccuracy in the molding operation for the housing 72 and an inclination of the weir 84 toward the inside so as to pour the fixing resin into the resin pouring section 85 easily. Also, the bending section 89 serves as a rib so as to minimize the inaccuracies of the dimension of the housing 72 in a molding process therefore. Also, the bending section 89 minimizes non-uniformity in the thickness of the fixing resin 75 after a potting process even if the amount of the fixing resin 75 fluctuates to some extent when it is poured in a potting process.

If the bending section 89 is molded from a base end section 86 in the weir 84, the thickness of the fixing resin 75 is formed thinner undesirably. Also, it may be likely that the resin is removed off by a pressure which is applied inside the housing such as a negative pressure which is caused in a suction filtrating operation and a positive pressure which is caused in a reverse-flow cleaning operation; thus, anti-pressure characteristics in the hollow fiber membrane module may be affected. Also, the width of the housing 72 becomes too wide; thus, it may be likely that a problem occurs in that an membrane area ratio per unit volume decreases because the integration of a plurality of the hollow fiber membrane modules 71 is limited when a plurality of the hollow fiber membrane modules are integrated so as to form a unit.

From the above point of view, it is preferable that a height D of the weir body 87 is set to be in a range of from 10 to 90% of the overall height E of the weir 84, by which it is possible to maintain the thickness of the fixing resin and the anti-pressure characteristics of the hollow fiber membrane module 71. If the height D of the weir 87 is not greater than 10% of the overall height E of the weir 84, it is possible that the anti-pressure characteristics in the hollow fiber membrane module 71 will be insufficient. If the height D of the weir 87 exceeds 90% of the overall height E of the weir 84, it may not be possible to realize the effects by the bending section 89 such as restricting the inaccuracy in the dimension of the weir 84 and the inclination of the weir 84 toward the inside so as to pour the fixing resin into the resin pouring section easily. Here, the height D of the weir body 87 is defined as the height from the base end section 86 of the weir 84 to a tip 88 of the weir body 87. Also, the overall height E of the weir 84 is defined as the height from the base end section 86 of the weir 84 to a tip section 90.

Also, it is preferable that a ratio (F:G) between an interval F between a tip section 90 in a weir and a tip section 90 in another weir 84 and an interval G between a base tip section 86 of a weir 84 and another base tip section 86 of another weir 84 is in a range of 10:9 to 2:1. If a difference in the above ratio is smaller than 10:9, there is a concern that it is difficult to pour the fixing resin. If a difference in the above ratio is larger than 2:1, it is difficult to handle the hollow fiber membrane modules efficiently and more amount of fixing resin is necessary. Here, the interval F indicates a distance between inner walls of the tip section 90 on the facing weirs 84. The interval G indicates a distance between inner walls of the base end section 86 on the facing weirs 84.

The thickness of the opening section 82 affects a quality in the potting operation; therefore, it is necessary to control the thickness of the opening section 82 so as to grasp the hollow fiber membrane 13 tightly. The thickness of the opening section 82 is preferably in a range of, for example, 0.1 to 30 mm. Further more preferably, the thickness of the opening section 82 should be controlled within a range of 0.1 to 20 mm.

Dimension in the housing 72 is adjusted preferably according to factors such as a dimension of the hollow fiber membrane bundle 14 which is fixed and a usage of the hollow fiber membrane module 71.

Also, it is possible to use a member which is the same as the housing 32 which is described above for the housing 72. Also, it is possible to use a member which is the same as the fixing resin 35 which is described above for the fixing resin 75.

In such a hollow fiber membrane module 71, the housing 72 is provided with the weirs 84 which are disposed in parallel with the opening section 82 on both sides of the opening section 82. Also, the weir 84 is provided with the bending section which bends from the tip 88 of the weir body 87 toward the outside; therefore, it is possible to pour the fixing resin into the resin pouring section. Also, the weir 84 is provided with the bending section 89; therefore, the housing 72 is not deformed in a molding operation. Therefore, it is possible to realize a sufficient capacity in the resin pouring section 85 which is sandwiched by the weirs 84. By doing this, the hollow fiber membrane bundle 14 is fixed on the housing 72 by the fixing resin 75 reliably; therefore, a product yield of the hollow fiber membrane module 71 can be enhanced.

Also, in such a hollow fiber membrane module 71, the weir 84 is provided with the bending section 89 which bends fro the tip section 88 of the weir body 87 toward thereoutside; therefore, it is possible to realize a sufficient capacity in the resin pouring section 85 which is sandwiched by the weirs 84. In addition, it is possible to reduce the fluctuation in the thickness in the fixing resin 75 after the potting operation even if the amount of the resin which is poured in the potting operation fluctuates to some extent. By doing this, the anti-pressure characteristics in the hollow fiber membrane module 71 can be enhanced.

Also, in the hollow fiber membrane module 71, the bending section 89 of the weir 84 serves as a rib; it is possible to set the higher integration ratio in the hollow fiber membrane module having a superior anti-pressure characteristics when a plurality of the hollow fiber membrane modules so as to be a unit. Therefore, it is possible to use such a hollow fiber membrane module 71 preferably for a filtrating process in which there is a limitation for a size of the unit.

Fourth Aspect of the Hollow Fiber Membrane Module

FIGS. 11 to 14 show an example for the hollow fiber membrane module according to the present invention. Here, a hollow fiber membrane module 91 approximately comprises a housing 93 in which an inner path 92 is formed, and end cap 95 which is attached to an end of the housing 93 and has a processed-water exit 94, an end cap 96 which is attached to another end of the housing 93 and does not have an processed-water exit, and a hollow fiber membrane bundle 14 in which a plurality of the hollow fiber membranes 13 are formed as a sheet. An end section of the hollow fiber membrane bundle 14 is fixed on the housing 93 by a fixing member 99 which is made of a fixing resin under condition that the end of the hollow fiber membrane 14 is inserted in the housing 93 and the opening end section 19 of the hollow fiber membrane 13 is maintained open. Also, the end caps 95, 96 are fixed on the housing 93 by the fixing member 99 under condition that the end caps 95, 96 are inserted in the inner path 92 partly.

Figure 15:
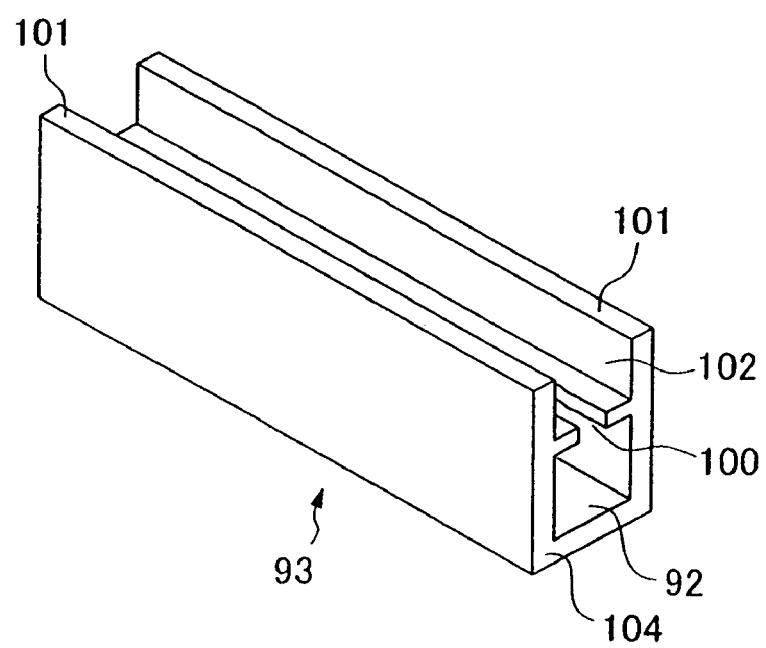
FIG. 15 is a perspective view of the housing which is used in the hollow fiber membrane module shown in FIG. 11.

As shown in FIG. 15, the housing 93 is provided with the hollow inner path 92 which is formed in the housing 93, a slit opening section 100 which is formed on the side of the housing 93, weirs 101 which are formed unitarily with the housing 93 so as to sandwich the opening section 100, and a resin pouring section 102 having a concave cross section which is sandwiched by the weirs 101.

The opening section 100 is a slit hole which serves as a hole through which the end section of the hollow fiber membrane bundle 14 is inserted in the inner path 92. Also, the opening section 100 serves as a port from which the fixing resin is poured into a resin pouring space which is explained later. The resin pouring space is formed between the inner path 92 on the housing 93 and the end caps 95, 96 which are inserted in the inner path 92. Also, the weir 101 prevent an undesirable overflow of the fixing resin.

Also, it is possible to use any member which is the same as the housing 32 which is explained above for the housing 93.

Figure 16:
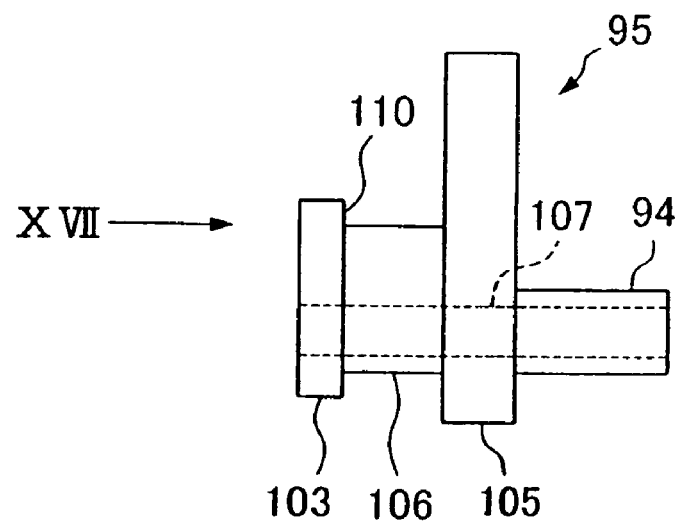
FIG. 16 is a side view of an end cap which is used in the hollow fiber membrane module shown in FIG. 11.
Figure 17:
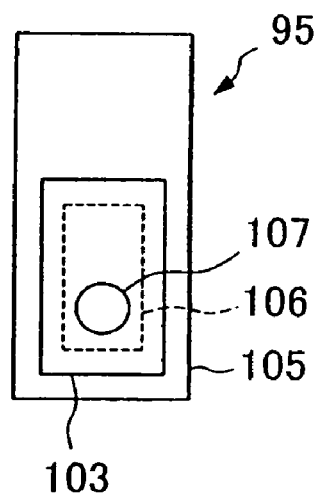
FIG. 17 is a front view of an end cap which is used in the hollow fiber membrane module shown in FIG. 11.

As shown in FIGS. 16 and 17, the end cap 95 is provided with a flat small lid section 103 which is inserted in the inner path 92 in the housing 93 so as to seal the inner path 92, a flat large lid section 105 which contacts an end surface 104 of the housing 93, a connecting section 106 for connecting the small lid section 103 and the large lid section 105 such that an area in a cross section orthogonal to a longitudinal direction of the housing 93 is smaller than an area of the small lid section 103, a communicating hole 107 which is formed on the small lid section 103, the connecting section 106, and the large lid section 105, and a processed-water exit 94 which is formed on a surface of the large lid section 105 so as to communicate the connecting hole 107.

Figure 18:
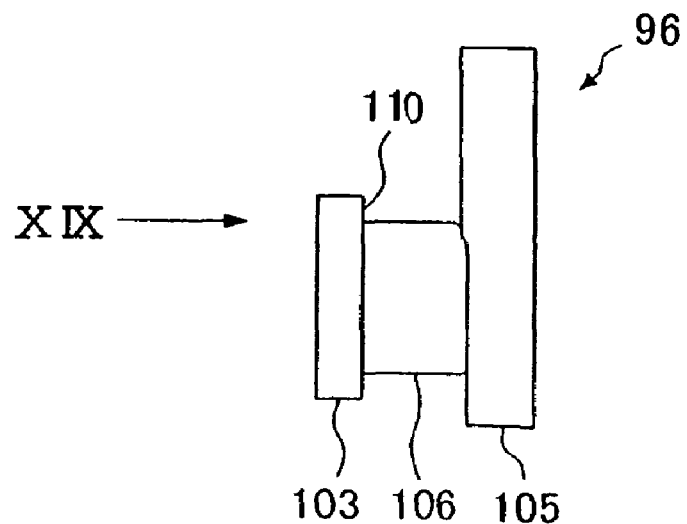
FIG. 18 is a side view showing other example for the end cap which is used in the hollow fiber membrane module shown in FIG. 11.
Figure 19:
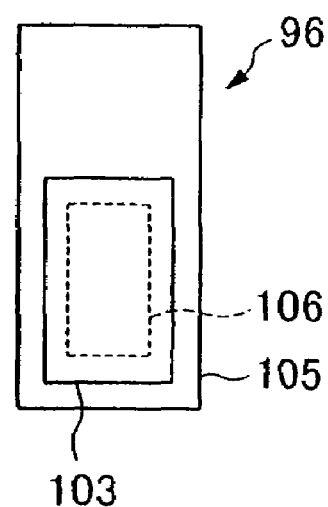
FIG. 19 is a front view showing other example for the end cap which is used in the hollow fiber membrane module shown in FIG. 11.

Also, as shown in FIGS. 18 and 19, the end cap 96 is provided with a flat small lid section 103 which is inserted in the inner path 92 on the housing 93 so as to seal the inner path 92, a large lid section 105 which contacts an end surface 104 of the housing 93, a connecting section 106 for connecting the small lid section 103 and the large lid section 105 such that an area in a cross section orthogonal to a longitudinal direction of the housing 93 is smaller than an area of the small lid section 103.

A longitudinal length and a latitudinal length in the small lid section 103 are approximately the same as those dimensions in the opening section in the inner path 92 such that the opening section opens very slightly and does not allow that the fixing resin flowing into the inner path 92 on the housing 93. The space between the inner wall of the housing 93 and an outer periphery of the small lid section 103 depends on a viscosity of the fixing resin. In an ordinary case, it is preferable that the space between the inner wall of the housing 93 and an outer periphery of the small lid section 103 is not larger than 1 mm. The thickness of the small lid section 103 depends on a viscosity of the fixing resin. In an ordinary case, it is sufficient if the thickness of the small lid section 103 is not thinner than 0.1 mm. More preferably, the thickness of the small lid section 103 should be not thinner than 1 mm so as to prevent the fixing resin from flowing into the inner path 92 reliably.

A longitudinal length and a latitudinal length in the large lid section 105 are approximately the same as those dimensions in the cross section in the housing 93 such that the inner path 92 is sealed and the resin pouring section 102 is blocked when the large lid section 105 contacts an outer wall of the housing 93.

The connecting section 106 is formed between the small lid section 103 and the large lid section 105 unitarily. A cross section of the connecting section 106 which is orthogonal to the longitudinal direction of the housing 93 is smaller than the small lid section 103. By doing this, a resin pouring space 108 is formed between an outer peripheral wall of the connecting section 106 and an inner peripheral wall of the housing 93 when the end caps 95, 96 are attached on the housing 93. The resin pouring space 108 is surrounded by the connecting section 106, the small lid section 103, the large lid section 105, and an inner peripheral wall. The resin pouring space 108 continues over an entire outer periphery of the connecting section 106. Also, the opening section 100 which communicates the resin pouring space 108 becomes a resin pouring port 109.

As explained above, the cross section in the connecting section 106 is smaller than an area of the small lid section 103. By doing this, a step section 110 is formed at an approximate border between the connecting section 106 and the small lid section 103. The step section 110 is caught by the fixing member 99 which is filled in the resin pouring space 108; thus, it is possible to prevent the end caps 95, 96 from being removed from the housing 93. Thus, the end caps 95, 96 are fixed on the housing 93 reliably.

Also, it is preferable that a surface of the outer periphery wall of the connecting section 106 is finished roughly by using, for example, a sanding paper because it is possible to increase the contact between the connecting section 106 and the fixing member 99.

It is possible to use, for example, polycarbonate, polysulfone, acrylic resin, ABS resin, modified PPE, polyvinyl chloride, polyolefin (polypropylene, polyethylene, etc.) for a member for the end caps 95, 96. It is possible to form the end caps 95, 96 in a metal-cutting operation or a molding operation by a metal mold. In the hollow fiber membrane module 1, it is necessary to dispose at least an end cap 95 which has a processed-water exit 94 as an exit of the processed-water.

Dimensions in the resin pouring space 103 into which the fixing member 99 is filled such as an interval (hereinafter described as a thickness) between the outer peripheral wall of the connecting section 106 and the inner peripheral wall of the housing 93 and a depth (hereinafter described as a depth) in the longitudinal direction of the housing 93 depend on a viscosity of the fixing resin which is used. Thus, the dimensions in the resin pouring space 103 are not limited specifically. The dimensions in the resin pouring space 103 may be any value as long as the fixing resin flows over the entire outer periphery of the connecting section 106 of the end caps 95, 96 such that the fixing member 99 can be formed continuously. That is, it is sufficient if the dimension in the resin pouring space 108 is adjusted according to the viscosity of the fixing resin which is used. When the viscosity of the fixing resin is high, it is sufficient if the resin pouring space 108 is increased to a preferable size so as to reduce the fluid friction loss.

For example, under condition that a two-liquid-mixed urethane resin having 1,500 mPa.multidot.s of mixture initial viscosity (potlife: 50,000 mPa.multidot.s time of concentration 25 minutes) is used for a fixing resin, a length of the outer periphery of the connecting section 106 of the end caps 95, 96 is 30 mm, and the cross section in the resin pouring space 108 which is orthogonal to the longitudinal direction of the housing 93 is not smaller than 0.4 mm$^2$ (dimension of the resin pouring space 108: thickness is not thinner than 0.2 mm, depth is not less than 2 mm), it is preferable because it is possible to realize a continuous fixing member 99. Under condition that the thickness of the resin pouring space 108 is not thicker than 0.2 mm, and the depth of the resin pouring space 108 is not deeper than 2 mm, the resin pouring space 108 becomes too narrow; therefore, the fluid friction loss increases and the urethane resin does not flow desirably. The viscosity of the urethane resin increases as time passes. Therefore, the fixing resin has a high fluid friction loss. If it takes too much time to pouring the urethane resin, the fixing resin looses its fluidity; thus, there is a possibility in that a defect fixing condition occurs. Therefore, it is preferable that the resin pouring space 108 is formed as large as possible.

The fixing member 99 serves as a member for fixing the opening end section 19 of the hollow fiber membrane 13 which is contained in the housing 32 while maintaining the opening end section 19 opened and separating a water-to-be-processed and a processed-water in a water-tight manner such that the hollow fiber membrane 13 serves as a filtrating membrane. Also, the fixing member 99 serves as a member for fixing the end caps 95, 96 on the housing 93 in a water-tight manner.

For a fixing resin for forming the fixing member 99, in an ordinary case, it is possible to use epoxy resin, unsaturated polyester resin, urethane resin, and various hotmelt resins so as to choose preferably.

The contact between the housing 93 and the end caps 95, 96 depend on the fixing resin. In order to choose the fixing resin, it is necessary to take the member for the housing 93 and the end caps 95, 96 into account so as to choose a preferable member. For example, when members for the housing 93 and the end caps 95, 96 are ABS resins respectively, it is preferable to use epoxy resin or urethane resin because of their desirable bonding characteristics for a fixing resin.

The viscosity of the fixing resin before solidified is not limited specifically. Preferably, the viscosity of the fixing resin before solidified should be in a range of 500 to 5000 mPa.multidot.s. More preferably, the viscosity of the fixing resin before solidified should be in a range of 2000 to 3000 mPa.multidot.s. If the viscosity of the fixing resin before solidified is not higher than 500 mPas, the fixing resin flows to the opening end section 19 of the 13; therefore, there is a concern that such a fixing resin cause a blocking of the opening end section 19. If the viscosity of the fixing resin before solidified exceeds 5000 mPa.multidot.s, it is not preferable because it is difficult to permeate the fixing resin in a plurality of the hollow fiber membranes 13.

In such a hollow fiber membrane module 91, the fixing member 99 fixes the hollow fiber membrane bundle 14 on the housing 93, the fixing member 99 fixes the end caps 95, 96 on the housing 93. Also, a member for fixing the hollow fiber membrane bundle 14 on the housing 93 and a member for fixing the end caps 95, 96 on the housing 93 are formed as a unit. Therefore, rigidity near an attaching area where the housing 93 and the end caps 95, 96 increases; thus, a physical strength in an area in which the housing 93 and the end caps 95, 96 are attached increases.

Also, the end caps 95, 96 are provided with step sections 110 which are formed due to a difference between the cross section in the small lid section 103 and the cross section in the connecting section 106. Therefore, the step sections 110 are caught by the fixing member 99 which is filled in the resin pouring space 108; thus, the end caps 95, 96 are prevented from being removed from the housing 93. Therefore, it is possible to fix the end caps 95, 96 on the housing 93 reliably.

Figure 20:
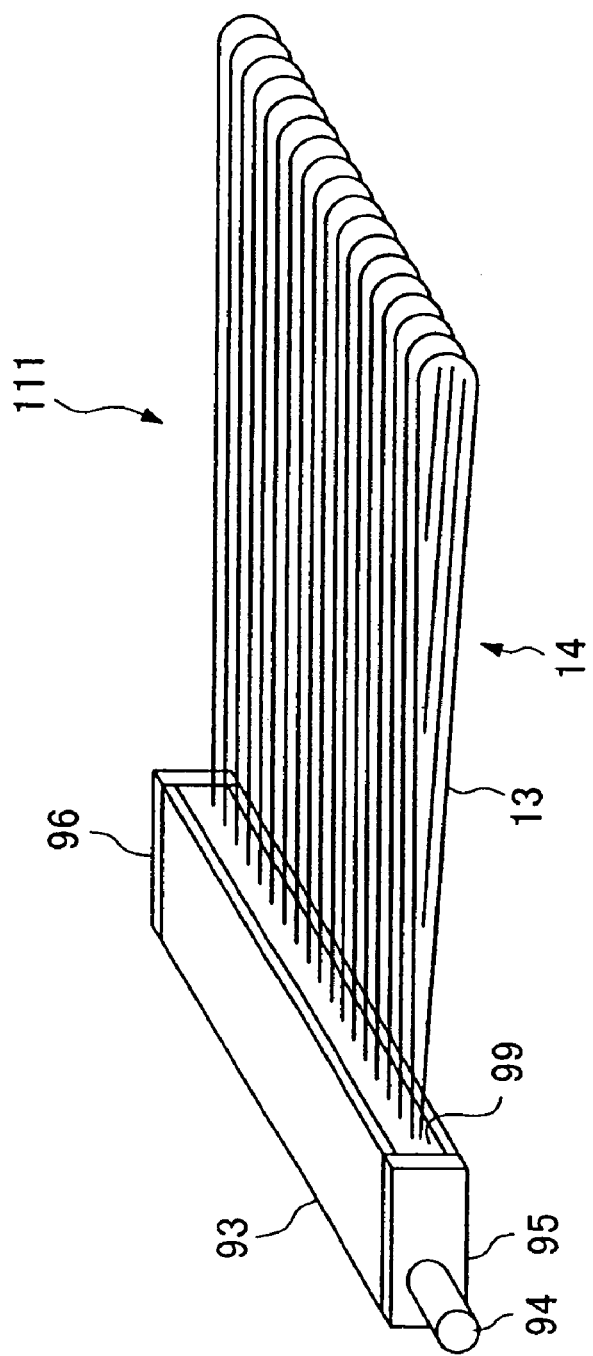
FIG. 20 is a perspective view showing other example for the hollow fiber membrane module according to the present invention.

Here, the hollow fiber membrane module according to the present invention is not limited to the hollow fiber membrane module 91 shown in the drawings. For example, as shown in FIG. 20, it is preferable to use a hollow fiber membrane module 111 in which both end sections of the hollow fiber membrane 14 which is bent in a U-letter shape is fixed on a piece of the housing 93.

Also, the shape of the housing is not limited to a rectangular shape shown in the drawings. It may be acceptable if the housing is formed in a cylindrical shape. In such a case, the small lid section and the large lid section of the end cap are formed in a circular plate.

Next, a method for manufacturing the hollow fiber membrane module 91 is explained.

First, an end section of the hollow fiber membrane 13 which forms the hollow fiber membrane bundle 14 is cut so as to be opened in advance. Next, an end section of the hollow fiber membrane bundle 14 is inserted in an opening section 100 on the housing 93 such that an opening end section 19 of the hollow fiber membrane 13 is disposed on an inner path 92 on the housing 93.

Figure 21:
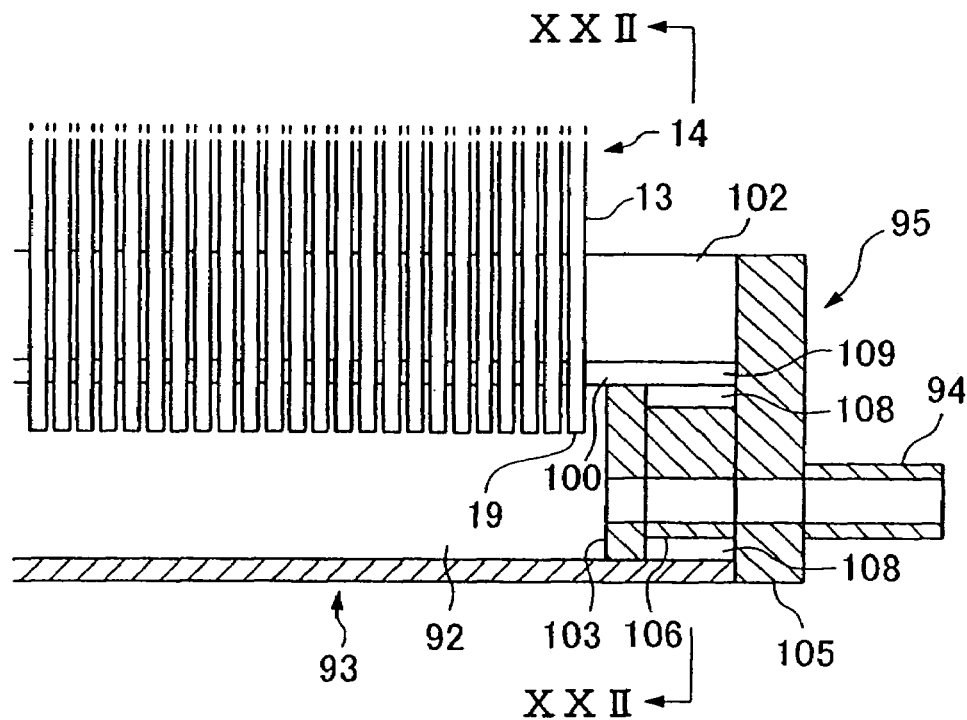
FIG. 21 is a cross section for explaining a method for manufacturing the hollow fiber membrane module shown in FIG. 11.
Figure 22:
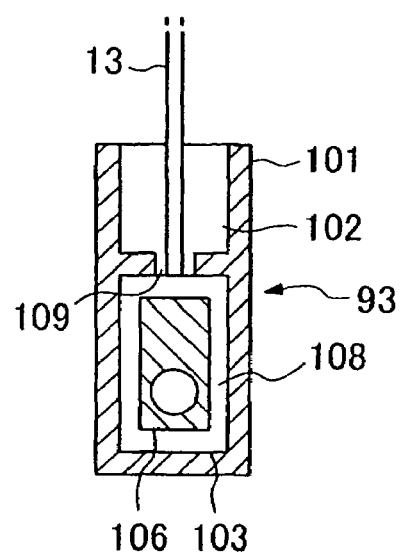
FIG. 22 is a cross section viewed in a line XXII-XXII shown in FIG. 21.

After the end section of the hollow fiber membrane bundle 14 is contained in the housing 93, the small lid section 103 and the connecting section 106 on the end caps 95, 96 are inserted in the inner path 92 as shown in FIGS. 21 and 22; thus, the end caps 95, 96 are attached on the housing 93.

Figure 23:
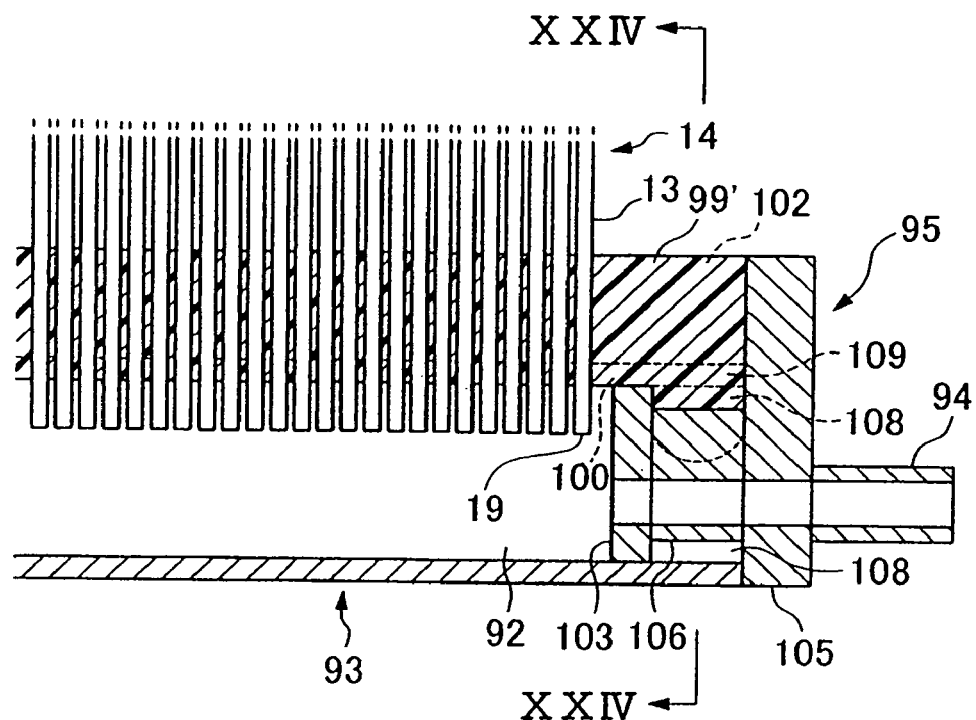
FIG. 23 is a cross section for explaining a method for manufacturing the hollow fiber membrane module shown in FIG. 11.
Figure 24:
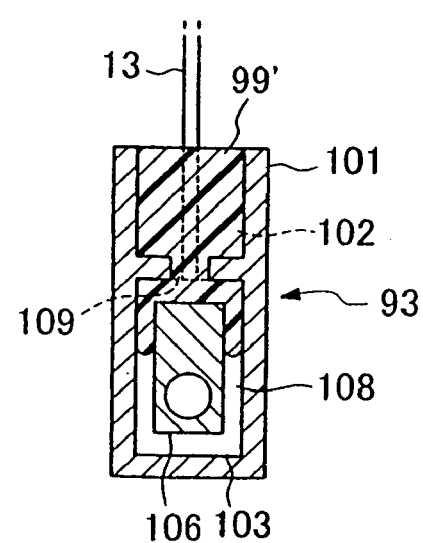
FIG. 24 is a cross section viewed in a line XXIV-XXIV shown in FIG. 25.

Next, as shown in FIGS. 23 and 24, a liquid fixing resin 99' is filled in the resin pouring section 102 and the opening section 100 from the outside of the housing 93 while maintaining the opening end section 19 on the hollow fiber membrane 13 opened.

Figure 25:
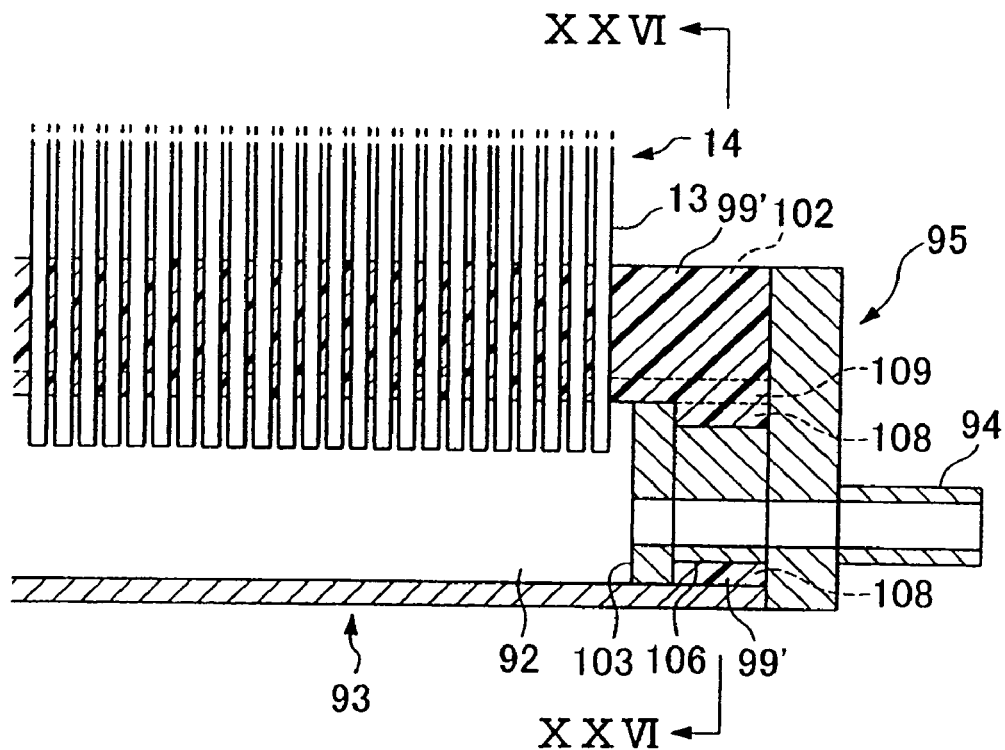
FIG. 25 is a cross section for explaining a method for manufacturing the hollow fiber membrane module shown in FIG. 11.
Figure 26:
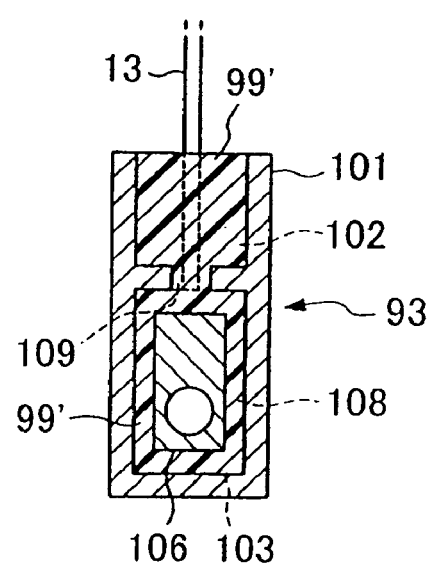
FIG. 26 is a cross section vied in a line XXVI-XXVI shown in FIG. 25.
Figure 27:
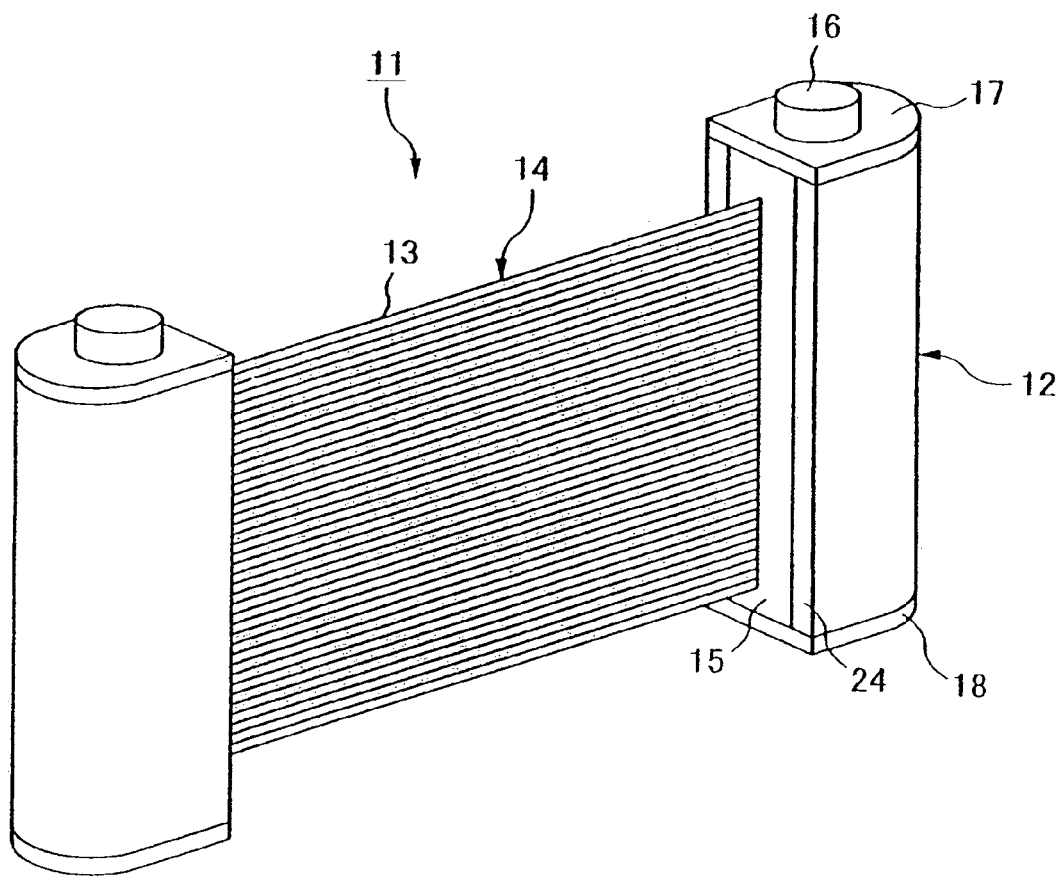
FIG. 27 is a perspective view showing an example for a conventional hollow fiber membrane module.
Figure 28:
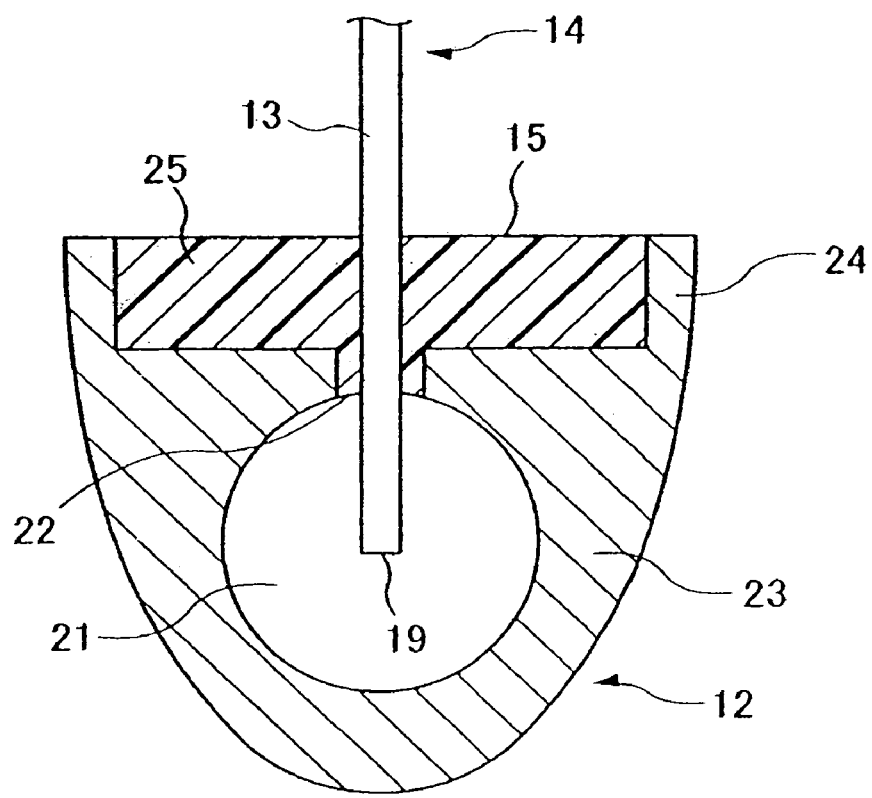
FIG. 28 is a cross section in the housing in the conventional hollow fiber membrane module shown in FIG. 27.

Simultaneously, the fixing resin 99' flows in the resin pouring space 108 which is formed between the housing 93 and the end caps 95, 96 by its weight via the resin flowing port 109 as a part of the opening section 100. Consequently, as shown in FIGS. 25 and 26, the fixing resin 99' prevails over the resin pouring space 108 such that the fixing resin 99' surrounds the connecting section 106. By solidifying the fixing resin 99', the attaching operation for the housing 93 and the end caps 95, 96 is completed.

It is preferable to contain the end section of the hollow fiber membrane bundle 14 in the housing 93 after widening the opening section 100 on the housing 93. It is necessary to open at least an end of the housing 93 so as to widen the opening section 100 easily. For that purpose, it is necessary to attach the end caps 95, 96 on the housing 93 after the hollow fiber membrane bundle 14 is contained in the housing 93.

It is not necessary to apply a bonding agent on the end caps 95, 96 so as to attach the housing 93 and the end caps 95, 96 together for manufacturing a hollow fiber membrane module 91. It may be acceptable if the end caps 95, 96 are inserted in the housing 93. Consequently, by pouring the fixing resin 99' into the housing 93, the fixing resin 99' flows into the resin pouring section 102 and the resin pouring space 108 by its weight. After that, the fixing operation for the hollow fiber membrane bundle 14 on the housing 93 and the fixing operation for the end caps 95, 96 on the housing 93 are completed by solidifying the fixing resin 99'. Therefore, it is possible to attaché the end caps 95, 96 on the housing 93 efficiently.

INDUSTRIAL APPLICABILITY

As explained above, in the hollow fiber membrane module according to the present invention, a maximum width (A) in an orthogonal direction to a longitudinal direction of the hollow fiber membrane is no longer than 25 mm in a cross section which is orthogonal to a longitudinal direction of the housings, and a maximum deflection in the housings which are measured is not more than 1% of a distance between the two housings; therefore, it is possible to enhance the integration ratio of the hollow fiber membrane module per a unit volume of the hollow fiber membrane module unit in which there is less deflections in the housing caused by factors such as an air bubble; the entanglement of the hollow fiber membranes does not occur.

Also, if the housing is provided with the reinforcing rib section for strengthening the housing, it is possible to restrict the further more deflection in the housing.

Also, if the cross section in the housing having the reinforcing rib section is in an approximate H-letter shape, it is possible to handle the hollow fiber membrane module in a manufacturing process efficiently. Also, it is possible to set the high integration ratio of the hollow fiber membrane module in the hollow fiber membrane module unit in a designing process; thus, an anti-deflection strength of the housing increases.

Also, if the housing is provided an engaging section for engaging an external supporting section for supporting the hollow fiber membrane module, the external supporting member reinforces the housing; therefore, it is possible to restrict the deflection in the housing.

Also, if two concave lanes which are sandwiched by the reinforcing rib sections are formed on a side of the housing, and two convex lanes which extends in a longitudinal direction of the housing as the engaging section while facing each other are formed on the reinforcing rib section so as to face the concave lanes, it is possible to engage the external supporting member on the housing reliably. Also, it is possible to attach and detach the hollow fiber membrane module with the external supporting member.

A hollow fiber membrane module unit according to the present invention is a hollow fiber membrane module unit in which a plurality of the hollow fiber membrane modules are disposed approximately in parallel, and an interval (C) between a center (a) in a width direction of the housing in the hollow fiber membrane module and a center (a') in a width direction of the housing in a neighboring hollow fiber membrane module is no longer than 25 mm. Therefore, it is possible to set the high integration ratio of the hollow fiber membrane module unit per a unit volume, and also, it is possible to minimize the deflection in the housing due to factors such as an air bubble. Furthermore, it is possible to prevent the hollow fiber membrane module from being broken after a long period of usage.

Furthermore, according to a method for manufacturing a membrane module according to the present invention, a pressure is applied on the reinforcing rib section (convex lane sections) horizontally from the housing of the membrane module so as to widen the opening section. After that, the end section of the filtrating membrane is inserted through the opening section, the filtrating membrane is fixed on the housing by the fixing resin such that the opening end section of the filtrating membrane is maintained opened. Therefore, it is possible to manufacture the membrane module in which there are few breakage and crush in the filtrating membrane efficiently.

Furthermore, in the hollow fiber membrane flat module according to the present invention, the housing is provided with a slit opening section through which an end section of the hollow fiber membrane bundle is inserted into the housing and a weirs which are formed on both sides of the opening section so as to be parallel with the opening section, and the weir is provided with a weir body and a bending section which bends from the tip of the weir body toward thereoutside. Therefore, it is possible to eliminate approximately all of the defect potting operation caused by factors such as inaccuracy of the dimension in the housing and the inclination of the hollow fiber. In addition, the thickness of the fixing resin is uniform; therefore, the hollow fiber membrane module has superior anti-pressure characteristics.

Furthermore, in a hollow fiber membrane module according to the present invention, an end cap is attached to at least an end of the housing in a water-tight manner in which an inner path which is a path for a processed water from the hollow fiber membrane is formed, and at least an edge end section of the hollow fiber membrane is fixed to the housing by a fixing member made of a fixing resin in a water-tight manner, the fixing member fixes the hollow fiber membrane on the housing, and the fixing member fixes the end cap on the housing. Therefore, the end caps are prevented from being removed from the housing; thus, the end caps are fixed on the housing reliably.

Also, in a follow fiber membrane module according to the present invention, the end cap is provided with a small lid section which is inserted in the inner path in the housing, a large lid section which contacts an end surface of the housing, and a connecting section for connecting the small lid section and the large lid section such that an area in a cross section orthogonal to a longitudinal direction of the housing is smaller than an area of the small lid section, and the fixing member is filled in a resin pouring space which is formed between an outer periphery wall of the connecting section of the end cap and an inner periphery wall of the housing. Therefore, the end caps are prevented from being removed from the housing; thus, the end caps are fixed on the housing reliably.

Also, a method for manufacturing a hollow fiber membrane module in the present invention has steps for containing the opening end section of the hollow fiber membrane in the housing from the opening section which is formed on a side of the housing, attaching the end cap on the end section of the housing, pouring a liquid fixing resin into the resin pouring section which is formed in a periphery of the opening section, fixing the hollow fiber membrane on the housing, pouring a fixing resin into the resin pouring space which is formed between the housing and the end cap, and fixing the end cap on the housing. Therefore, it is possible to manufacture a hollow fiber membrane module having a superior physical strength in an area in which the housing and the end caps are attached together easily and efficiently.

What is claimed is:

1. A hollow fiber membrane module in which an end cap is attached to at least an end of a housing in a water-tight manner, in which an inner path is formed for processed water from the hollow fiber membrane, and at least an edge end section of the hollow fiber membrane Is fixed to the housing by a fixing member made of a fixing resin in a water-tight manner, wherein:

the fixing member fixes the hollow fiber membrane on the housing;

the fixing member fixes the end cop on the housing;

the fixing member is solidified after fixing the hollow fiber membrane on the housing;

the end cap is provided with a small lid section which is inserted in the inner path in the housing, a large lid section which contacts an end surface of the housing, and a connecting section for connecting the small lid section and the large lid section such that an area in a cross section orthogonal to a longitudinal direction of the housing is smaller than an area of the small lid section; and the fixing member is filled in a resin pouring space which is formed between an outer periphery wall of the connecting section of the end cap and an inner periphery wall of the housing.

* * * * *